(12) United States Patent
Watanabe et al.

(10) Patent No.: US 11,186,284 B2
(45) Date of Patent: Nov. 30, 2021

(54) CONTROL DEVICE

(71) Applicant: AISIN AW CO., LTD., Anjo (JP)

(72) Inventors: Ryo Watanabe, Aichi (JP); Yasuyuki Sato, Aichi (JP); Kenta Kimata, Aichi (JP); Takuro Iwase, Aichi (JP); Junichiro Ohtsubo, Aichi (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/972,141

(22) PCT Filed: Jul. 19, 2019

(86) PCT No.: PCT/JP2019/028523
§ 371 (c)(1),
(2) Date: Dec. 4, 2020

(87) PCT Pub. No.: WO2020/022224
PCT Pub. Date: Jan. 30, 2020

(65) Prior Publication Data
US 2021/0237740 A1    Aug. 5, 2021

(30) Foreign Application Priority Data

Jul. 25, 2018 (JP) .............................. JP2018-139550
Jul. 25, 2018 (JP) .............................. JP2018-139551

(51) Int. Cl.
B60W 30/19     (2012.01)
B60W 10/08     (2006.01)
(Continued)

(52) U.S. Cl.
CPC ......... B60W 30/19 (2013.01); B60L 15/2054 (2013.01); B60W 10/08 (2013.01);
(Continued)

(58) Field of Classification Search
CPC ...... B60W 30/19; B60W 30/20; B60W 10/08; B60W 10/10; B60W 2510/081;
(Continued)

(56) References Cited

U.S. PATENT DOCUMENTS 6,164,400 A    12/2000  Jankovic et al.
2015/0183422 A1*  7/2015  Imamura ............. B60W 30/192
                                                            477/3
(Continued)

FOREIGN PATENT DOCUMENTS

JP    2014-047817 A    3/2014
JP    2016-010230 A    1/2016
(Continued)

OTHER PUBLICATIONS

WO 2015052771 machine translation filed Aug. 25, 2021. (Year: 2021).*
(Continued)

Primary Examiner — Tisha D Lewis
(74) Attorney, Agent, or Firm — Sughrue Mion, PLLC

(57) ABSTRACT

A control device performs upshifting in a state in which an operating point of a rotating electrical machine for outputting requirement-based torque at wheel-based rotational speed falls within an operable range of the rotating electrical machine both before and after shifting a shift speed by the upshifting, and in which before shifting the shift speed, output torque from the rotating electrical machine is less than or equal to determination torque (T1), the wheel-based rotational speed being rotational speed of the rotating electrical machine based on rotational speed (V) of a wheel, the requirement-based torque being output torque from the rotating electrical machine based on required wheel transmission torque, and the determination torque (T1) being torque obtained by subtracting an amount of increased
(Continued)

torque (ΔTmg) resulting from torque increase control from maximum torque (Tmax) that can be outputted from the rotating electrical machine at the wheel-based rotational speed.

20 Claims, 6 Drawing Sheets

(51) Int. Cl.
| | | |
|---|---|---|
| *B60W 10/10* | (2012.01) | |
| *F16H 59/14* | (2006.01) | |
| *F16H 61/04* | (2006.01) | |
| *F16H 63/50* | (2006.01) | |
| *B60L 15/20* | (2006.01) | |
| *B60W 30/20* | (2006.01) | |
| *F16H 59/70* | (2006.01) | |
| *F16H 61/16* | (2006.01) | |

(52) U.S. Cl.
CPC .............. *B60W 10/10* (2013.01); *B60W 30/20* (2013.01); *F16H 59/14* (2013.01); *F16H 59/70* (2013.01); *F16H 61/04* (2013.01); *F16H 61/16* (2013.01); *F16H 63/502* (2013.01); *B60L 2240/48* (2013.01); *B60W 2510/081* (2013.01); *B60W 2510/083* (2013.01); *B60W 2520/28* (2013.01); *B60W 2520/30* (2013.01); *B60W 2530/00* (2013.01); *B60W 2710/083* (2013.01); *B60W 2710/1005* (2013.01); *B60W 2720/30* (2013.01)

(58) Field of Classification Search
CPC ....... B60W 2510/083; B60W 2520/28; B60W 2520/30; B60W 2530/00; B60W 2710/083; B60W 2710/1005; B60W 2720/30; B60L 15/2054; B60L 2240/48; F16H 59/14; F16H 59/70; F16H 61/04; F16H 61/16; F16H 63/502
See application file for complete search history.

(56) References Cited

U.S. PATENT DOCUMENTS

| | | | |
|---|---|---|---|
| 2017/0327122 A1 | 11/2017 | Ishida et al. | |
| 2020/0023726 A1* | 1/2020 | Tsuda | F16H 61/686 |

FOREIGN PATENT DOCUMENTS

| | | | | |
|---|---|---|---|---|
| WO | WO-2015052771 A1 * | 4/2015 | ............ | B60W 10/08 |
| WO | 2016/104800 A1 | 6/2016 | | |

OTHER PUBLICATIONS

International Search Report for PCT/JP2019/028523 dated Aug. 27, 2019 [PCT/ISA/210].

* cited by examiner

CONTROL DEVICE

CROSS REFERENCE TO RELATED APPLICATIONS

This application is a National Stage of International Application No. PCT/JP2019/028523 filed Jul. 19, 2019, claiming priority based on Japanese Patent Application No. 2018-139550 filed Jul. 25, 2018 and Japanese Patent Application No. 2018-139551 filed Jul. 25, 2018 the contents of which are incorporated in their entirety.

TECHNICAL FIELD

The present disclosure relates to a control device whose control target is a vehicle drive device having an automatic transmission provided in a power transmission path that connects a rotating electrical machine to a wheel.

BACKGROUND ART

An example of a control device such as that described above is described in JP 2014-47817 A (Patent Literature 1). Reference signs shown in parentheses in description of the Background Art below are those of Patent Literature 1. A control target for a control device described in Patent Literature 1 is a vehicle motor drive device (A) such as that shown in FIG. 3 of the literature. The vehicle motor drive device (A) includes an electric motor (3); a transmission (5) that changes the speed of rotation of an output shaft (4) of the electric motor (3) and outputs the rotation; and a differential (6) that distributes the rotation outputted from the transmission (5) to a pair of wheels. Patent Literature 1 describes a configuration in which gear changes in the transmission (5) are performed based on a transmission map that defines an up-shift line and a down-shift line, such as that shown in FIG. 10 of the literature.

Meanwhile, during operation of upshifting which is shifting of a shift speed formed by an automatic transmission from a first shift speed to a second shift speed having a smaller gear ratio than the first shift speed, a drive power transmission path in the automatic transmission shifts from a first-shift-speed state to a second-shift-speed state. At this time, when output torque from a rotating electrical machine is constant, due to a reduction in wheel transmission torque which is torque transmitted from the rotating electrical machine to wheels, there is a possibility that an occupant of a vehicle senses deceleration. Though not described in Patent Literature 1, it is conceivable that such a reduction in wheel transmission torque caused by a reduction in gear ratio is compensated for by increasing the output torque from the rotating electrical machine. However, due to limitations on maximum torque that can be outputted from the rotating electrical machine, depending on an operating point of the rotating electrical machine before shifting the shift speed, the output torque from the rotating electrical machine may not be able to be sufficiently increased and the reduction in wheel transmission torque may not be appropriately compensated for.

CITATIONS LIST

Patent Literature

Patent Literature 1: JP 2014-47817 A

SUMMARY OF THE DISCLOSURE

Technical Problems

Hence, it is desired to implement a technique in which upon performing upshifting, a reduction in wheel transmission torque caused by a reduction in gear ratio can be appropriately compensated for by an increase in output torque from the rotating electrical machine.

Solutions to Problems

In a control device whose control target is a vehicle drive device having an automatic transmission provided in a power transmission path that connects a rotating electrical machine to a wheel, according to the present disclosure, the control device is configured such that when the control device performs upshifting, the control device performs, during operation of the upshifting, torque increase control in which output torque from the rotating electrical machine is increased so as to compensate for a reduction in wheel transmission torque caused by a reduction in gear ratio, the upshifting being shifting of a shift speed formed by the automatic transmission from a first shift speed to a second shift speed having a smaller gear ratio than the first shift speed, and the wheel transmission torque being torque transmitted from the rotating electrical machine to the wheel through the automatic transmission, and the upshifting is performed in a state in which an operating point of the rotating electrical machine for outputting requirement-based torque at wheel-based rotational speed falls within an operable range of the rotating electrical machine both before and after shifting the shift speed by the upshifting, and in which before shifting the shift speed, output torque from the rotating electrical machine is less than or equal to determination torque, the wheel-based rotational speed being rotational speed of the rotating electrical machine based on rotational speed of the wheel, the requirement-based torque being output torque from the rotating electrical machine based on the required wheel transmission torque, and the determination torque being torque obtained by subtracting an amount of increased torque resulting from the torque increase control from maximum torque that can be outputted from the rotating electrical machine at the wheel-based rotational speed.

According to this configuration, by performing torque increase control during upshifting operation, a reduction in wheel transmission torque caused by a reduction in gear ratio can be compensated for by an increase in output torque from the rotating electrical machine. In the above-described configuration, the state of the rotating electrical machine upon performing upshifting is a state in which the following two conditions, a first condition and a second condition, are satisfied. Here, the first condition is that an operating point of the rotating electrical machine for outputting requirement-based torque at wheel-based rotational speed falls within an operable range of the rotating electrical machine both before and after shifting the shift speed by the upshifting, and the second condition is that before shifting the shift speed, output torque from the rotating electrical machine is in a state of being less than or equal to determination torque which is torque obtained by subtracting an amount of increased torque resulting from torque increase control from maximum torque that can be outputted from the rotating electrical machine at the wheel-based rotational speed. As such, by the state of the rotating electrical machine upon performing upshifting being a state in which the second condition is satisfied in addition to the first condition, in torque increase control performed during upshifting operation, output torque from the rotating electrical machine can be increased by an amount of increased torque without subject to limitations on the maximum torque. As a result, upon performing upshifting, a reduction in wheel transmission torque caused by a reduction in gear ratio can be appropriately compensated for by an increase in output torque from the rotating electrical machine.

Further features and advantages of the control device will become apparent from the following description of embodiments which will be described with reference to drawings.

DESCRIPTION OF EMBODIMENTS

First Embodiment

Figure 1:
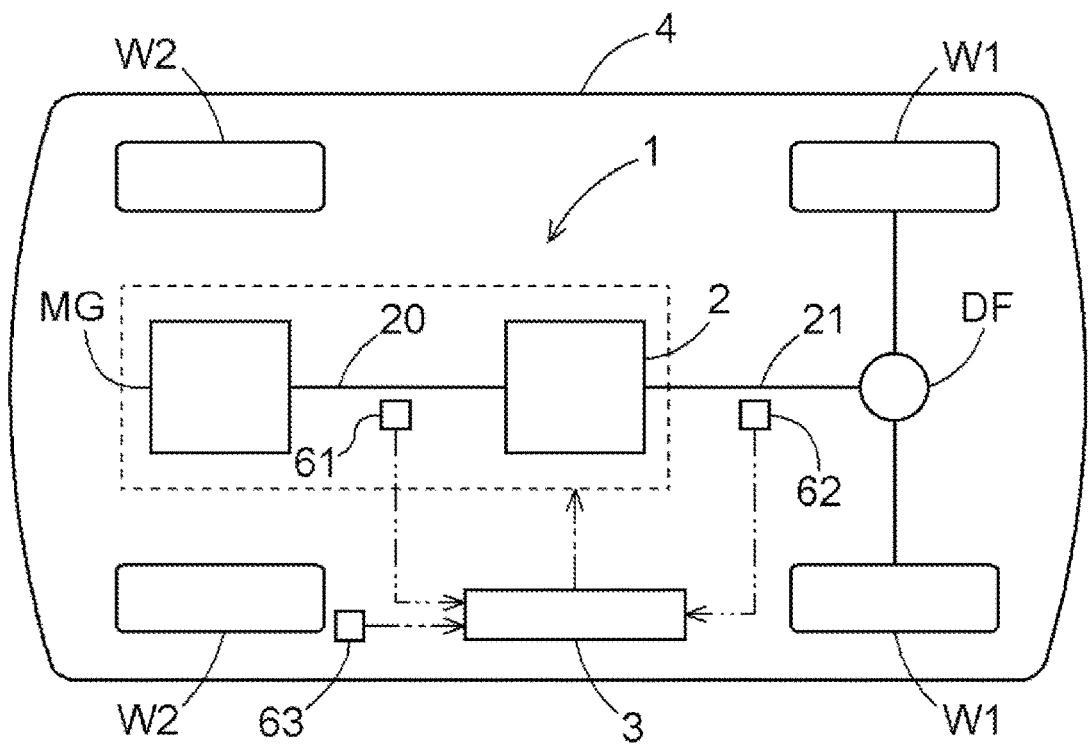
FIG. 1 is a diagram showing a schematic configuration of a vehicle drive device according to a first embodiment.
Figure 2:
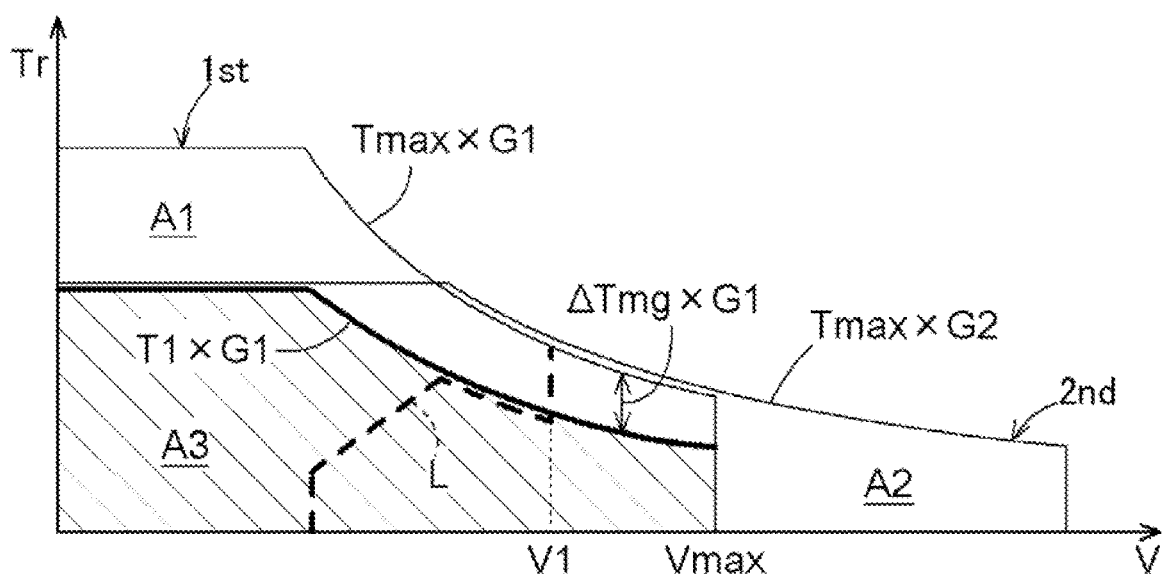
FIG. 2 is a diagram showing an example of a transmission map according to the first embodiment.
Figure 3:
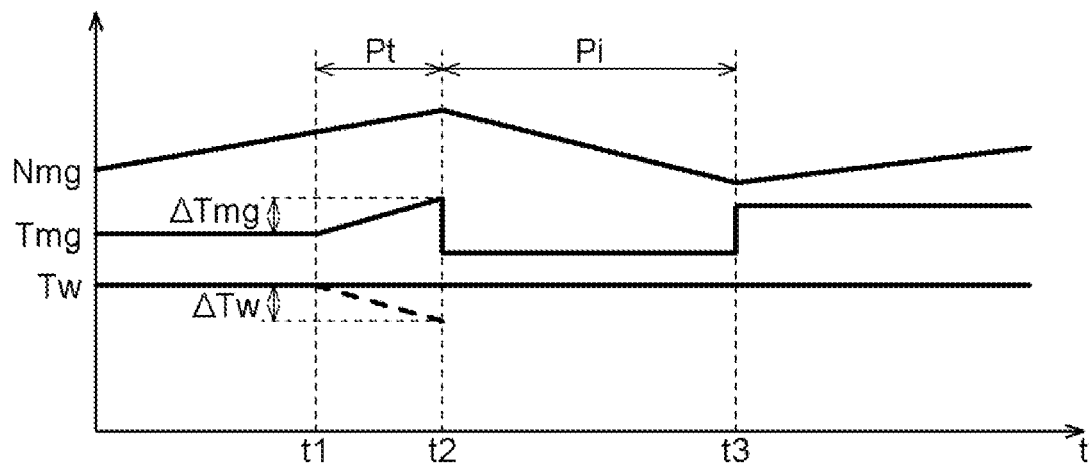
FIG. 3 is a time chart showing an example of control behavior of upshifting control according to the first embodiment.

A first embodiment of a control device will be described with reference to drawings (FIGS. 1 to 3). Note that in this specification a "rotating electrical machine" is used as a concept that includes all of a motor, a generator, and a motor-generator that functions as both a motor and a generator as necessary. Note also that in this specification "drive-coupled" refers to a state in which two rotating elements are coupled together so that they can transmit drive power. This concept includes a state in which two rotating elements are coupled together such that they rotate together, and a state in which two rotating elements are coupled together via one or more power transmission members so that they can transmit drive power. Such power transmission members include various types of members (shafts, gear mechanisms, belts, chains, etc.) that transmit rotation at the same speed or at a changed speed, and may include engagement devices (friction engagement devices, mesh engagement devices, etc.) that selectively transmit rotation and drive power.

As shown in FIG. 1, a control device 3 is a control device whose control target is a vehicle drive device 1 having an automatic transmission 2 provided in a power transmission path that connects a rotating electrical machine MG to first wheels W1. The vehicle drive device 1 allows a vehicle 4 having the vehicle drive device 1 mounted thereon to travel by transmitting output torque Tmg from the rotating electrical machine MG to the first wheels W1. In the present embodiment, the power transmission path is provided so as to connect the rotating electrical machine MG to the two left and right first wheels W1, and the vehicle drive device 1 transmits output torque Tmg from the rotating electrical machine MG to the two left and right first wheels W1. Specifically, the vehicle drive device 1 includes a differential gear device DF (output differential gear device) between the automatic transmission 2 and the two left and right first wheels W1 in the above-described power transmission path. The differential gear device DF distributes and transmits rotation and torque which are inputted from a rotating electrical machine MG side (automatic transmission 2 side) to the two left and right first wheels W1. In the present embodiment, the first wheel W1 corresponds to a "wheel".

In the present embodiment, the vehicle 4 is provided with second wheels W2 which are independent of the power transmission path connecting the rotating electrical machine MG to the first wheels W1. Either ones of the first wheels W1 and the second wheels W2 are front wheels of the vehicle 4, and the other ones of the first wheels W1 and the second wheels W2 are rear wheels of the vehicle 4. In the present embodiment, the vehicle drive device 1 does not include any other drive power source for the first wheels W1 than the rotating electrical machine MG, and does not include a drive power source for the second wheels W2, either. Namely, in the present embodiment, the vehicle drive device 1 is a drive device for an electric motor vehicle (electric vehicle).

Though depiction is omitted, the rotating electrical machine MG includes a stator fixed to a non-rotating member such as a case; and a rotor which is rotatably supported on the stator. Here, the rotating electrical machine MG is an alternating-current rotating electrical machine which is driven by alternating current (e.g., three-phase alternating current). The rotating electrical machine MG is electrically connected to an electrical storage device such as a battery or a capacitor through an inverter that converts electric power between direct-current electric power and alternating-current electric power, and performs motoring by receiving electric power supply from the electrical storage device, or supplies and stores electric power generated by inertial force, etc., of the vehicle 4 in the electrical storage device. Note that in this specification, for the positive and negative signs of torque such as output torque Tmg from the rotating electrical machine MG, torque in a direction in which the vehicle 4 moves forward is a positive torque, and torque in an opposite direction to the positive torque is a negative torque. Note also that in this specification, the magnitude of torque such as output torque Tmg from the rotating electrical machine MG is magnitude taking into account signs (positive and negative) instead of an absolute value. Namely, minimum torque that can be outputted from the rotating electrical machine MG is a negative torque having a maximum absolute value, and maximum torque Tmax that can be outputted from the rotating electrical machine MG is a positive torque having a maximum absolute value.

The automatic transmission 2 changes the speed of rotation of an input member 20 and transmits the rotation to an output member 21. The input member 20 is drive-coupled to the rotating electrical machine MG, and the output member 21 is drive-coupled to the first wheels W1. In the present embodiment, the input member 20 is coupled to the rotating electrical machine MG (specifically, the rotor of the rotating electrical machine MG) such that they rotate together. In addition, in the present embodiment, the output member 21 is coupled to the first wheels W1 through the above-described differential gear device DF.

The automatic transmission 2 is a stepped automatic transmission that can form a plurality of shift speeds having different gear ratios, and changes the speed of rotation of the input member 20 at a gear ratio determined based on a formed shift speed, and transmits the rotation to the output member 21. Note that the "gear ratio" is a ratio of the rotational speed of the input member 20 to the rotational speed of the output member 21. Though depiction is omitted, the automatic transmission 2 includes a plurality of transmission engagement devices, and forms any of the plurality of shift speeds according to a state of engagement of each of the transmission engagement devices. As the automatic transmission 2, a planetary gear automatic transmission which is constructed by using a single or a plurality of planetary gear mechanisms can be used. In this case, by controlling a differential state of each planetary gear mechanism by the transmission engagement devices, a shift speed to be formed is changed.

The plurality of shift speeds (a plurality of forward shift speeds, hereinafter, the same applies to this paragraph.) formed by the automatic transmission 2 include a first shift speed and a second shift speed having a smaller gear ratio than the first shift speed. In the present embodiment, two shift speeds adjacent to each other are the first shift speed and the second shift speed. In addition, in the present embodiment, the first shift speed is a shift speed having the largest gear ratio among the plurality of shift speeds formed by the automatic transmission 2, and the second shift speed is a shift speed having the smallest gear ratio among the plurality of shift speeds formed by the automatic transmission 2. Note that it is also possible to adopt a configuration in which the automatic transmission 2 can form a forward shift speed having a gear ratio smaller than the first shift speed and larger the second shift speed, a configuration in which the automatic transmission 2 can form a forward shift speed having a larger gear ratio than the first shift speed, or a configuration in which the automatic transmission 2 can form a forward shift speed having a smaller gear ratio than the second shift speed.

The control device 3 includes, as a core member, an arithmetic processing device such as a central processing unit (CPU) and includes storage devices that can be referred to by the arithmetic processing device, such as a random access memory (RAM) and a read only memory (ROM). Each function of the control device 3 is implemented by software (programs) stored in a storage device such as the ROM, hardware such as an arithmetic circuit provided separately, or both of them. The arithmetic processing device included in the control device 3 operates as a computer that executes each program. The control device 3 may include a set of a plurality of pieces of hardware (a plurality of separated pieces of hardware) that can communicate with each other. In this case, the control device 3 can also be configured such that the control device 3 is separated into an in-vehicle device mounted on the vehicle 4 and an out-of-vehicle device which is provided external to the vehicle 4 and can communicate with the in-vehicle device through a communication network (e.g., the Internet), and at least one of the functions of the control device 3 is provided in the out-of-vehicle device.

The vehicle 4 includes various types of sensors, and the control device 3 is configured to be able to obtain detection information (sensor detection information) of the various types of sensors. In the present embodiment, as shown in FIG. 1, the plurality of sensors whose detection information can be obtained by the control device 3 include a first sensor 61, a second sensor 62, and a third sensor 63.

The first sensor 61 is a sensor for obtaining rotational speed Nmg of the rotating electrical machine MG, and the control device 3 obtains rotational speed Nmg of the rotating electrical machine MG based on detection information of the first sensor 61. In the present embodiment, the first sensor 61 is provided so as to detect rotational speed of the input member 20, and the control device 3 obtains rotational speed Nmg of the rotating electrical machine MG based on the rotational speed of the input member 20 detected by the first sensor 61.

The second sensor 62 is a sensor for obtaining vehicle speed which is travel speed of the vehicle 4, and the control device 3 obtains vehicle speed based on detection information of the second sensor 62. In the present embodiment, the second sensor 62 is provided so as to detect rotational speed of the output member 21, and the control device 3 obtains vehicle speed based on the rotational speed of the output member 21 detected by the second sensor 62. Note that the configuration may be such that the second sensor 62 is provided so as to detect rotational speed of the first wheels W1 or a rotating member (a drive shaft, etc.) that rotates together with the first wheels W1, and the control device 3 obtains vehicle speed based on detection information (detection information of wheel speed V which is the rotational speed of the first wheels W1) of the second sensor 62. In the present embodiment, the wheel speed V corresponds to "rotational speed of the wheel".

The third sensor 63 is a sensor for obtaining an accelerator pedal position, and the control device 3 obtains an accelerator pedal position based on detection information of the third sensor 63. In the present embodiment, the third sensor 63 is provided so as to detect the amount of operation on an accelerator pedal provided on the vehicle 4, and the control device 3 obtains an accelerator pedal position based on the amount of operation on the accelerator pedal detected by the third sensor 63.

The control device 3 determines wheels' required torque Tr which is a requirement value of wheel transmission torque Tw and a target shift speed to be formed by the automatic transmission 2, based on sensor detection information (in the present embodiment, based on at least an accelerator pedal position and vehicle speed (or wheel speed V)). Here, the wheel transmission torque Tw is torque transmitted from the rotating electrical machine MG to the first wheels W1 through the automatic transmission 2. The control device 3 controls the rotating electrical machine MG so as to output output torque Tmg determined based on the determined wheels' required torque Tr, and controls the automatic transmission 2 so as to form the determined target shift speed.

A range of torque that can be outputted from the rotating electrical machine MG (a range from minimum torque to maximum torque) changes depending on the rotational speed Nmg of the rotating electrical machine MG. Since the rotating electrical machine MG rotates at wheel-based rotational speed which is the rotational speed Nmg of the rotating electrical machine MG based on wheel speed V (in other words, the rotational speed Nmg of the rotating electrical machine MG based on vehicle speed), a range of torque that can be determined as wheels' required torque Tr changes depending on wheel speed V (or vehicle speed) as shown in FIG. 2 which will be referred to later. Thus, the control device 3 determines wheels' required torque Tr within a range of torque determined based on wheel speed V (or vehicle speed), such that the wheels' required torque Tr increases as the accelerator pedal position increases. Note that the wheel-based rotational speed is determined based on the wheel speed V and a gear ratio from the rotating electrical machine MG to the first wheels W1 (a ratio of the rotational speed Nmg of the rotating electrical machine MG to the wheel speed V).

The control device 3 performs control such that the rotating electrical machine MG outputs requirement-based torque by controlling an operating point (rotational speed Nmg and output torque Tmg) of the rotating electrical machine MG through the above-described inverter. Here, the requirement-based torque is output torque Tmg from the rotating electrical machine MG based on required wheel transmission torque Tw (i.e., wheels' required torque Tr), and is determined based on the wheels' required torque Tr and a gear ratio from the rotating electrical machine MG to the first wheels W1.

In addition, the control device 3 determines a target shift speed by referring to a transmission map that defines a transmission line (an up-shift line and a down-shift line) such as a transmission line L, an example of which is shown in FIG. 2. Then, the control device 3 allows the automatic transmission 2 to form the target shift speed (in the present embodiment, either one of the first shift speed and the second shift speed) by controlling a state of engagement of each of the plurality of transmission engagement devices included in the automatic transmission 2. When the control device 3 performs transmission control to shift a shift speed formed by the automatic transmission 2 (in other words, to change the shift speed), the control device 3 disengages a transmission engagement device that is disengaged to shift the shift speed (disengaged-side engagement device) and engages a transmission engagement device that is engaged to shift the shift speed (engaged-side engagement device).

Next, operations of upshifting control performed by the control device 3 will be described. In the following description, upshifting which is shifting of a shift speed formed by the automatic transmission 2 from the first shift speed to the second shift speed is simply referred to as "upshifting". In addition, a gear ratio from the rotating electrical machine MG to the first wheels W1 with the first shift speed formed by the automatic transmission 2 is a "first gear ratio G1", and a gear ratio from the rotating electrical machine MG to the first wheels W1 with the second shift speed formed by the automatic transmission 2 is a "second gear ratio G2".

During upshifting operation, a drive power transmission path in the automatic transmission 2 shifts from a first-shift-speed state to a second-shift-speed state. At this time, when the output torque Tmg from the rotating electrical machine MG is constant, the wheel transmission torque Tw decreases due to a reduction in gear ratio. To put it simply, the amount of reduction in torque $\Delta Tw$ which is the amount of reduction in the wheel transmission torque Tw can be represented by the product of the output torque Tmg from the rotating electrical machine MG and the amount of reduction in gear ratio (G1−G2), as $\Delta Tw = Tmg \times (G1-G2)$. To suppress a change in vehicle behavior caused by such a reduction in the wheel transmission torque Tw to a small level, the control device 3 is configured such that when upshifting is performed, the control device 3 performs, during operation of the upshifting, torque increase control in which the output torque Tmg from the rotating electrical machine MG is increased so as to compensate for the reduction in the wheel transmission torque Tw caused by the reduction in gear ratio.

In the present embodiment, in torque increase control, the control device 3 controls the output torque Tmg from the rotating electrical machine MG such that the wheel transmission torque Tw is maintained at required torque (i.e., wheels' required torque Tr) during upshifting operation. Namely, assuming that the wheels' required torque Tr is constant during upshifting operation, in the torque increase control, the output torque Tmg from the rotating electrical machine MG is controlled such that the amount of reduction in torque $\Delta Tw$ is zero, in other words, the amount of reduction in torque $\Delta Tw$ gets close to zero. Hence, in the present embodiment, by the torque increase control, a reduction in the wheel transmission torque Tw caused by a reduction in gear ratio is completely or substantially completely compensated for by an increase in the output torque Tmg from the rotating electrical machine MG.

To put it simply, a first output torque Tmg1 which is output torque Tmg from the rotating electrical machine MG with the drive power transmission path in the automatic transmission 2 being in a first-shift-speed state is controlled to satisfy the relationship "$Tmg1 \times G1 = Tr$", by which the wheel transmission torque Tw can be made identical to the wheels' required torque Tr when the drive power transmission path in the automatic transmission 2 is in the first-shift-speed state. In addition, a second output torque Tmg2 which is output torque Tmg from the rotating electrical machine MG with the drive power transmission path in the automatic transmission 2 being in a second-shift-speed state is controlled to satisfy the relationship "$Tmg2 \times G2 = Tr$", by which the wheel transmission torque Tw can be made identical to the wheels' required torque Tr when the drive power transmission path in the automatic transmission 2 is in the second-shift-speed state. Thus, assuming that the wheels' required torque Tr is constant during upshifting operation, the second output torque Tmg2 is set according to the first output torque Tmg1 so as to satisfy the relationship "$Tmg1 \times G1 = Tmg2 \times G2$", by which the wheel transmission torque Tw can be maintained at the wheels' required torque Tr during upshifting operation.

In view of the above-described respects, in the present embodiment, the control device 3 sets output torque Tmg (second output torque Tmg2) from the rotating electrical machine MG having been increased by torque increase control to torque based on $(Tmg1 \times G1/G2)$. Here, the control device 3 sets the output torque Tmg from the rotating electrical machine MG having been increased by torque increase control to torque identical or comparable to $(Tmg1 \therefore G1/G2)$. Thus, in the present embodiment, an amount of increased torque $\Delta Tmg$ ($=Tmg2-Tmg1$) of the rotating electrical machine MG resulting from the torque increase control is an amount identical or comparable to $\{Tmg1 \times (G1-G2)/G2\}$. When the drive power transmission path in the automatic transmission 2 is in a second-shift-speed state, an amount of increased torque ($\Delta Tmg \times G2$) of the wheel transmission torque Tw based on the amount of increased torque $\Delta Tmg$ is identical or comparable to the amount of reduction in torque $\Delta Tw$ ($=Tmg1 \times (G1-G2)$) at a time when the output torque Tmg from the rotating electrical machine MG is maintained at the first output torque Tmg1. As such, in the present embodiment, an amount of increased torque $\Delta Tmg$ of the rotating electrical machine MG resulting from the torque increase control is set such that the amount of reduction in torque ΔTw is zero, by which the wheel transmission torque Tw can be maintained at the wheels' required torque Tr.

As will be described later, in the present embodiment, the control device 3 performs torque increase control in a torque phase Pt. Thus, output torque Tmg (corresponding to the above-described second output torque Tmg2) from the rotating electrical machine MG having been increased by torque increase control is torque based on (T×G1/G2) in which T (corresponding to the above-described first output torque Tmg1) is requirement-based torque before starting the torque phase Pt. Here, the output torque Tmg from the rotating electrical machine MG having been increased by torque increase control is torque identical or comparable to (T×G1/G2). Note that the first gear ratio G1 and the second gear ratio G2 used here each may be a gear ratio from the input member 20 to the output member 21 (a ratio of the rotational speed of the input member 20 to the rotational speed of the output member 21) instead of a gear ratio from the rotating electrical machine MG to the first wheels W1.

As described above, the control device 3 performs, during upshifting operation, torque increase control in which the output torque Tmg from the rotating electrical machine MG is increased by an amount of increased torque ΔTmg, and thereby compensates for a reduction in the wheel transmission torque Tw caused by a reduction in gear ratio. Hence, in order to appropriately compensate for the reduction in the wheel transmission torque Tw caused by the reduction in gear ratio by performing torque increase control, it is required that the output torque Tmg from the rotating electrical machine MG be able to be increased by the amount of increased torque ΔTmg without subject to limitations on maximum torque Tmax that can be outputted from the rotating electrical machine MG. In view of this respect, the control device 3 is configured to perform upshifting in a state in which an operating point of the rotating electrical machine MG for outputting requirement-based torque at wheel-based rotational speed falls within an operable range of the rotating electrical machine MG both before and after shifting the shift speed by the upshifting, and in which before shifting the shift speed, the output torque Tmg from the rotating electrical machine MG is less than or equal to determination torque T1 which is torque obtained by subtracting an amount of increased torque ΔTmg resulting from torque increase control from maximum torque Tmax that can be outputted from the rotating electrical machine MG at the wheel-based rotational speed.

Namely, the control device 3 is configured to perform upshifting when the state of the rotating electrical machine MG satisfies the following two conditions, a first condition and a second condition. Here, the first condition is that an operating point of the rotating electrical machine MG for outputting requirement-based torque at wheel-based rotational speed falls within an operable range of the rotating electrical machine MG both before and after shifting the shift speed by the upshifting, and the second condition is that before shifting the shift speed, the output torque Tmg from the rotating electrical machine MG is less than or equal to the determination torque T1. In other words, the control device 3 is configured basically not to perform upshifting in a state in which at least one of the first condition and the second condition is not satisfied. A reason why the two conditions are thus set will be described below with reference to FIG. 2.

FIG. 2 is a graph representing a travelable range at the first shift speed (1st) which is determined based on the operable range (output characteristic) of the rotating electrical machine MG and the first gear ratio G1 and a travelable range at the second shift speed (2nd) which is determined based on the operable range of the rotating electrical machine MG and the second gear ratio G2, with a horizontal axis being wheel speed V and a vertical axis being wheels' required torque Tr. The travelable range at the second shift speed (2nd) corresponds to a range obtained by extending the horizontal axis of the travelable range at the first shift speed (1st) by a factor of (G1/G2) and extending the vertical axis of the travelable range at the first shift speed (1st) by a factor of (G2/G1). The maximum torque Tmax that can be outputted from the rotating electrical machine MG generally has a tendency to decrease as the rotational speed Nmg increases, and thus, as shown in FIG. 2, the maximum value (Tmax×G1) of wheels' required torque Tr that can be set at the first shift speed and the maximum value (Tmax×G2) of wheels' required torque Tr that can be set at the second shift speed also have a tendency to decrease as the wheel speed V increases.

As shown in FIG. 2, the travelable range at the first shift speed (1st) includes a first area A1 that does not overlap the travelable range at the second shift speed (2nd); and a third area A3 that overlaps the travelable range at the second shift speed (2nd). In addition, the travelable range at the second shift speed (2nd) includes a second area A2 that does not overlap the travelable range at the first shift speed (1st); and the above-described third area A3. Namely, when an operating point determined by the wheel speed V and the wheels' required torque Tr is included in the third area A3, in both cases of forming the first shift speed and forming the second shift speed by the automatic transmission 2, an operating point of the rotating electrical machine MG determined by wheel-based rotational speed and requirement-based torque falls within the operable range of the rotating electrical machine MG. The above-described first condition is equal to the fact that an operating point determined by the wheel speed V and the wheels' required torque Tr is thus included in the third area A3. By performing upshifting in a state in which such a first condition is satisfied, the wheel transmission torque Tw can be made identical or comparable to the wheels' required torque Tr not only before but also after shifting the shift speed by the upshifting.

As shown in FIG. 3 which will be referred to later, upshifting operation includes a torque phase Pt which is a period during which the drive power transmission path in the automatic transmission 2 shifts from a first-shift-speed state to a second-shift-speed state, with the rotational speed Nmg of the rotating electrical machine MG maintained in a first-shift-speed state; and an inertia phase Pi which is a period during which the rotational speed Nmg of the rotating electrical machine MG shifts from the first-shift-speed state to a second-shift-speed state after the torque phase Pt. The control device 3 performs torque increase control in the torque phase Pt. Hence, in the torque increase control, there is a need to increase the output torque Tmg from the rotating electrical machine MG by an amount of increased torque ΔTmg, with the rotational speed Nmg of the rotating electrical machine MG maintained in the first-shift-speed state (i.e., with the rotational speed Nmg maintained at wheel-based rotational speed and at the first shift speed).

In view of this respect, the control device 3 is configured to perform upshifting on condition that an operating point determined by the wheel speed V and the wheels' required torque Tr is included in a hatched area which is hatched in FIG. 2 in addition to being included in the third area A3. Note that in an example shown in FIG. 2, the entire hatched area is included in the third area A3. Determination torque T1 that determines an upper limit (T1×G1) to the wheels' required torque Tr in the hatched area is torque obtained by subtracting an amount of increased torque ΔTmg resulting from torque increase control from maximum torque Tmax that can be outputted from the rotating electrical machine MG. Hence, when an operating point determined by the wheel speed V and the wheels' required torque Tr is included in the hatched area, the output torque Tmg from the rotating electrical machine MG can be increased by at least the amount of increased torque ΔTmg, with the rotational speed Nmg of the rotating electrical machine MG maintained in the first-shift-speed state. The above-described second condition is equal to the fact that an operating point determined by the wheel speed V and the wheels' required torque Tr is thus included in the hatched area. By performing upshifting in a state in which such a second condition is satisfied in addition to the first condition, in torque increase control performed during upshifting operation, the output torque Tmg from the rotating electrical machine MG can be increased by the amount of increased torque ΔTmg without subject to limitations on the maximum torque Tmax.

In a transmission map that is referred to when the control device 3 determines a target shift speed so that upshifting is thus performed in a state in which both the first condition and the second condition are satisfied (in other words, so that it is determined to perform upshifting), a transmission line L for upshifting is defined. Specifically, as shown in FIG. 2, the transmission line L (here, a part of the transmission line L) is defined inside an overlapping area of the third area A3 and the hatched area. Thus, upshifting performed when an operating point determined by the wheel speed V and the wheels' required torque Tr crosses the transmission line L on the transmission map can be basically upshifting performed in a state in which the state of the rotating electrical machine MG satisfies two conditions, the first condition and the second condition.

Note that, as shown in FIG. 2, in the present embodiment, a part of the transmission line L is defined in a portion inside the third area A3 and outside the hatched area. Specifically, the transmission line L is defined such that even when the output torque Tmg from the rotating electrical machine MG exceeds the determination torque T1 (i.e., even in a state in which the second condition is not satisfied), if the wheel speed V has reached a set threshold value V1 from a low-speed side, then upshifting is performed. Here, the set threshold value V1 is set to be less than or equal to a wheel speed upper limit value Vmax which is wheel speed V based on an upper rotational speed limit of the rotating electrical machine MG, with the first shift speed formed by the automatic transmission 2. In the present embodiment, the control device 3 is configured not to perform torque increase control in upshifting performed in such a case. Namely, the control device 3 is configured such that even when the output torque Tmg from the rotating electrical machine MG exceeds the determination torque T1, if the wheel speed V has reached the set threshold value V1 from the low-speed side, then upshifting is performed without performing torque increase control. Note that in view of the fact that vibration transmitted from the first wheels W1 or the second wheels W2 by travel of the vehicle 4 increases as vehicle speed increases and it becomes difficult for an occupant of the vehicle 4 to sense a change in vehicle behavior caused by a gear change, it is preferred that the set threshold value V1 be set to wheel speed V at which vibration caused by travel of the vehicle 4 is greater than or equal to vibration caused by upshifting in which torque increase control is not performed.

Note that although FIG. 2 exemplifies a case in which the set threshold value V1 is set to be less than the wheel speed upper limit value Vmax, the set threshold value V1 may be set to be identical to the wheel speed upper limit value Vmax.

Next, specific operations of upshifting control according to the present embodiment will be described with reference to an example shown in FIG. 3. Here, a situation is assumed in which output torque increase control is performed during transmission control of on-upshifting which is upshifting performed in a state in which torque in a forward acceleration direction is transmitted to the first wheels W1 (i.e., a state in which the output torque Tmg from the rotating electrical machine MG is a positive torque). In addition, here, a situation is assumed in which the wheels' required torque Tr is maintained at a constant level during upshifting control.

In the example shown in FIG. 3, a target shift speed is changed from the first shift speed to the second shift speed (i.e., it is determined to perform upshifting) at a point in time prior to time t1, and a torque phase Pt starts at time t1. Namely, at time t1, shifting of the drive power transmission path in the automatic transmission 2 from a first-shift-speed state to a second-shift-speed state starts. Note that prior to time t1 which is before shifting the shift speed, the rotating electrical machine MG is controlled to output requirement-based torque, with the first shift speed formed by the automatic transmission 2. In the present embodiment, an engaged-side engagement device which is engaged upon shifting a shift speed formed by the automatic transmission 2 from the first shift speed to the second shift speed is a friction engagement device such as a multiplate wet clutch or a multiplate wet brake. At a point in time prior to time t1, control to engage the engaged-side engagement device starts, and at and after time t1, shifting of the drive power transmission path in the automatic transmission 2 from a first-shift-speed state to a second-shift-speed state proceeds along with an increase in the engagement pressure of the engaged-side engagement device (an increase in transmission torque capacity).

As indicated by a broken line in FIG. 3, at and after time t1, when the output torque Tmg from the rotating electrical machine MG is maintained at a constant level, the wheel transmission torque Tw decreases according to an increase in torque ratio. Here, the torque ratio is a ratio of input torque inputted to the automatic transmission 2 from the input member 20 to output torque outputted to the output member 21 from the automatic transmission 2. On the other hand, in the present embodiment, since torque increase control is performed in the torque phase Pt, the reduction in the wheel transmission torque Tw caused by the increase in torque ratio can be compensated for by an increase in the output torque Tmg from the rotating electrical machine MG. As described above, in the present embodiment, since an amount of increased torque ΔTmg of the rotating electrical machine MG resulting from torque increase control is set such that the amount of reduction in torque ΔTw is zero, as indicated by a solid line in FIG. 3, the wheel transmission torque Tw can be maintained at the wheels' required torque Tr during a period from the start to end of the torque phase Pt. Note that in the example shown in FIG. 3, the torque increase control starts at a point in time when the torque phase Pt starts (time t1 in FIG. 3) and the torque increase control ends at a point in time when the torque phase Pt ends (time t2 in FIG. 3). In addition, in the example shown in FIG. 3, in the torque increase control, the output torque Tmg from the rotating electrical machine MG gradually increases such that the amount of increase in the output torque Tmg from the rotating electrical machine MG is the amount of increased torque ΔTmg at a point in time when the torque increase control ends (here, at a point of time when the torque phase Pt ends). Namely, the output torque Tmg from the rotating electrical machine MG increases in accordance with the increase in torque ratio.

When, as shown in FIG. 3, the torque phase Pt ends at time t2, an inertia phase Pi during which the rotational speed Nmg of the rotating electrical machine MG shifts from a first-shift-speed state to a second-shift-speed state starts. In the inertia phase Pi, the rotational speed Nmg of the rotating electrical machine MG is reduced to a point where the rotational speed Nmg of the rotating electrical machine MG shifts to the second-shift-speed state by, for example, reducing the output torque Tmg from the rotating electrical machine MG or increasing the engagement pressure of the engaged-side engagement device. In the example shown in FIG. 3, in the inertia phase Pi, too, the output torque Tmg from the rotating electrical machine MG is controlled such that the wheel transmission torque Tw is maintained at the wheels' required torque Tr. Namely, the output torque Tmg from the rotating electrical machine MG is controlled to suppress an increase in the wheel transmission torque Tw caused by inertial torque of each part in the rotating electrical machine MG and the automatic transmission 2. Then, when the rotational speed Nmg of the rotating electrical machine MG shifts to the second-shift-speed state at time t3, the shifting of the shift speed by upshifting is completed, and at and after time t3 which is after shifting the shift speed, the rotating electrical machine MG is controlled to output requirement-based torque, with the second shift speed formed by the automatic transmission 2.

Second Embodiment

A second embodiment of a control device will be described with reference to drawings (FIGS. 4 to 9). The following mainly describes differences between the control device of the present embodiment and the control device of the first embodiment. Components that are not specifically stated are the same as those of the first embodiment, and thus are given the same reference signs and a detailed description thereof is omitted.

Figure 4:
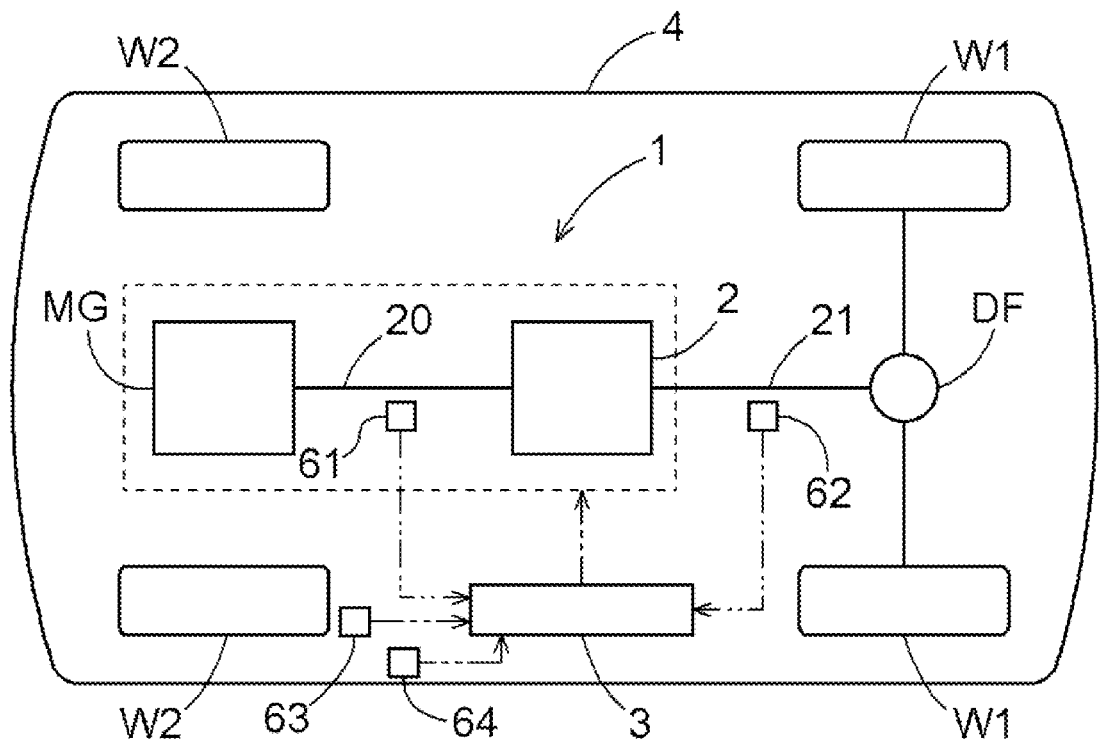
FIG. 4 is a diagram showing a schematic configuration of a vehicle drive device according to a second embodiment.

In the present embodiment, as shown in FIG. 4, a plurality of sensors whose detection information can be obtained by the control device 3 include a fourth sensor 64 in addition to the first sensor 61, the second sensor 62, and the third sensor 63.

The fourth sensor 64 is a sensor for detecting an operation of changing the shift speed (shift operation) by a driver of the vehicle 4, and the control device 3 detects a driver's shift operation (upshifting operation or downshifting operation) based on detection information of the fourth sensor 64. The fourth sensor 64 is, for example, provided to detect a driver's shift operation using a shift switch (e.g., a paddle switch) provided on a steering wheel in a driver's seat of the vehicle 4, or provided to detect a driver's shift operation using a shift lever for selecting a travel range.

Figure 5:
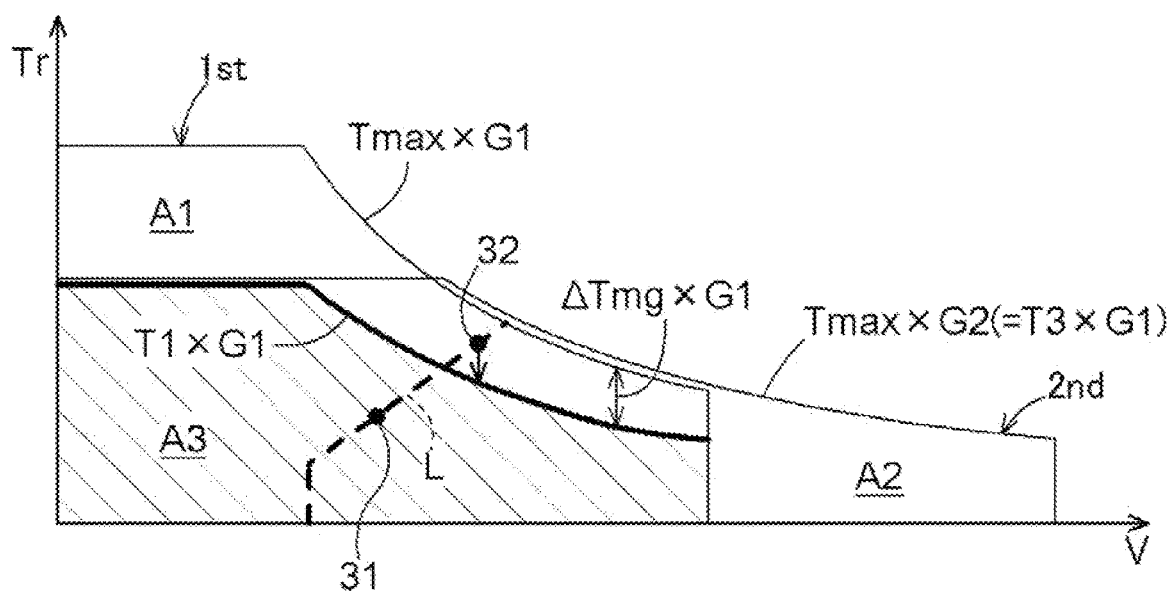
FIG. 5 is a diagram showing an example of travelable ranges at a first shift speed and a second shift speed according to the second embodiment.

As shown in FIG. 5, a transmission map that is referred to when the control device 3 determines a target shift speed defines a transmission line L for upshifting. When an operating point determined by wheel speed V and wheels' required torque Tr crosses the transmission line L (crosses the transmission line L from a low-speed side to a high-speed side) on the transmission map, the target shift speed is changed from the first shift speed to the second shift speed and upshifting is performed. Namely, when an operating point determined by the wheel speed V and the wheels' required torque Tr crosses or is predicted to cross the transmission line L on the transmission map, the control device 3 determines to perform upshifting. In addition, in the present embodiment, when a driver's upshifting operation has been detected, the target shift speed is changed from the first shift speed to the second shift speed on condition that upshifting prohibition conditions do not hold true, and upshifting is performed. Namely, when a driver's upshifting operation has been detected, the control device 3 determines to perform upshifting on condition that upshifting prohibition conditions do not hold true. Note that the upshifting prohibition conditions are, for example, that the wheel speed V (or vehicle speed) is less than or equal to a set value, elapsed time from the start of traveling at the first shift speed is less than or equal to a set value, and the temperature of hydraulic oil of the automatic transmission 2 is less than or equal to a set value.

During upshifting operation, the drive power transmission path in the automatic transmission 2 shifts from a first-shift-speed state to a second-shift-speed state. At this time, when the output torque Tmg from the rotating electrical machine MG is constant, the wheel transmission torque Tw decreases due to a reduction in gear ratio. To put it simply, the amount of reduction in torque ΔTw which is the amount of reduction in the wheel transmission torque Tw can be represented by the product of the output torque Tmg from the rotating electrical machine MG and the amount of reduction in gear ratio (G1−G2), as ΔTw=Tmg×(G1−G2). Note that the amount of reduction in torque ΔTw is the amount of reduction in the wheel transmission torque Tw caused by the reduction in gear ratio, and does not include the amount of reduction in the wheel transmission torque Tw caused by performing torque reduction control which will be described later. To suppress a change in vehicle behavior caused by such a reduction in the wheel transmission torque Tw to a small level, the control device 3 is configured such that when upshifting is performed, the control device 3 performs, during operation of the upshifting, torque increase control in which the output torque Tmg from the rotating electrical machine MG is increased so as to compensate for the reduction in the wheel transmission torque Tw caused by the reduction in gear ratio.

Figure 7:
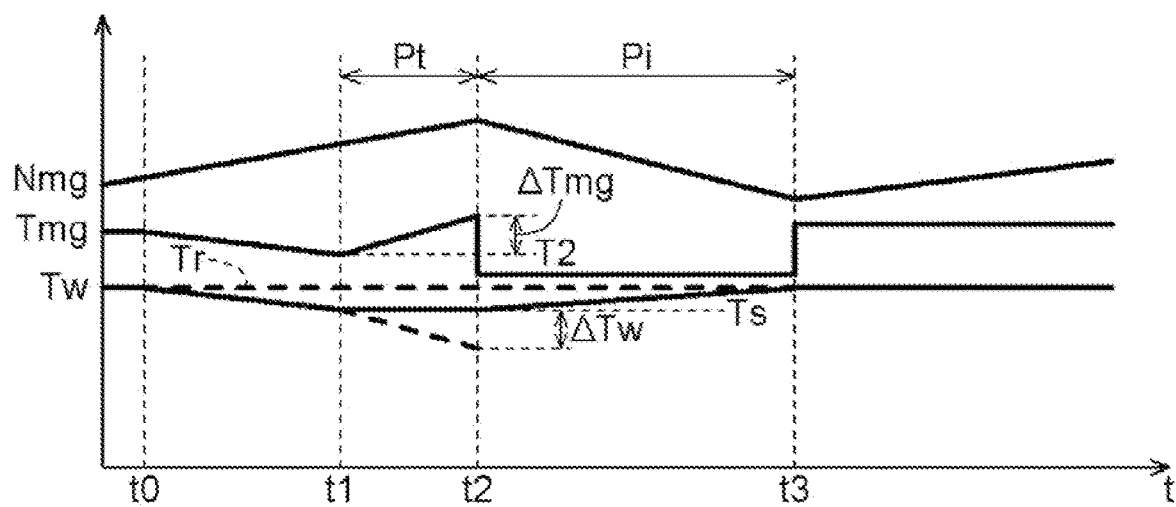
FIG. 7 is a time chart showing an example of control behavior of upshifting control according to the second embodiment.

In the present embodiment, in torque increase control, the control device 3 controls the output torque Tmg from the rotating electrical machine MG such that the wheel transmission torque Tw is maintained at object torque. Here, the object torque is identical to the wheels' required torque Tr when torque reduction control which will be described later is not performed, and is identical to subtracted torque Ts when torque reduction control which will be described later is performed. As shown in FIG. 7 which will be referred to later, the subtracted torque Ts is torque obtained by subtracting the amount of reduction in the wheel transmission torque Tw resulting from performing torque reduction control from the wheels' required torque Tr. As will be described later, in the torque reduction control, the output torque Tmg from the rotating electrical machine MG is reduced to target torque T2, and thus, the subtracted torque Ts is wheel transmission torque Tw based on the target torque T2, with the first shift speed formed by the automatic transmission 2. Namely, assuming that the wheels' required torque Tr is constant during upshifting operation, in torque increase control, the output torque Tmg from the rotating electrical machine MG is controlled such that the amount of reduction in torque ΔTw is zero, in other words, the amount of reduction in torque $\Delta$Tw gets close to zero. Hence, in the present embodiment, by the torque increase control, the reduction in the wheel transmission torque Tw caused by the reduction in gear ratio is completely or substantially completely compensated for by the increase in the output torque Tmg from the rotating electrical machine MG.

To put it simply, a first output torque Tmg1 which is output torque Tmg from the rotating electrical machine MG with the drive power transmission path in the automatic transmission 2 being in a first-shift-speed state is controlled to satisfy the relationship "Tmg1×G1=Tr", by which the wheel transmission torque Tw can be made identical to the wheels' required torque Tr when the drive power transmission path in the automatic transmission 2 is in the first-shift-speed state. In addition, a second output torque Tmg2 which is output torque Tmg from the rotating electrical machine MG with the drive power transmission path in the automatic transmission 2 being in a second-shift-speed state is controlled to satisfy the relationship "Tmg2×G2=Tr", by which the wheel transmission torque Tw can be made identical to the wheels' required torque Tr when the drive power transmission path in the automatic transmission 2 is in the second-shift-speed state. Thus, assuming that the wheels' required torque Tr is constant during upshifting operation, the second output torque Tmg2 is set according to the first output torque Tmg1 so as to satisfy the relationship "Tmg1× G1=Tmg2×G2", by which the wheel transmission torque Tw can be maintained at the wheels' required torque Tr during the upshifting operation. When torque reduction control which will be described later is performed, output torque (second output torque Tmg2) from the rotating electrical machine MG having been increased by torque increase control is set according to output torque (first output torque Tmg1) from the rotating electrical machine MG that has been reduced by the torque reduction control and that is before increased by the torque increase control, so as to satisfy the relationship "Tmg1×G1=Tmg2×G2", by which the wheel transmission torque Tw can be maintained at the subtracted torque Ts during a period during which the torque increase control is performed.

In view of the above-described respects, in the present embodiment, the control device 3 sets output torque Tmg (second output torque Tmg2) from the rotating electrical machine MG having been increased by torque increase control to torque based on (Tmg1×G1/G2). Here, the control device 3 sets the output torque Tmg from the rotating electrical machine MG having been increased by torque increase control to torque identical or comparable to (Tmg1×G1/G2). Thus, in the present embodiment, an amount of increased torque $\Delta$Tmg (=Tmg2−Tmg1) of the rotating electrical machine MG resulting from the torque increase control is an amount identical or comparable to {Tmg1×(G1−G2)/G2}. When the drive power transmission path in the automatic transmission 2 is in a second-shift-speed state, an amount of increased torque ($\Delta$Tmg×G2) of the wheel transmission torque Tw based on the amount of increased torque $\Delta$Tmg is identical or comparable to the amount of reduction in torque $\Delta$Tw (=Tmg1×(G1−G2)) at a time when the output torque Tmg from the rotating electrical machine MG is maintained at the first output torque Tmg1. As such, in the present embodiment, an amount of increased torque $\Delta$Tmg of the rotating electrical machine MG resulting from the torque increase control is set such that the amount of reduction in torque $\Delta$Tw is zero, by which the wheel transmission torque Tw can be maintained at object torque (the wheels' required torque Tr or the subtracted torque Ts) during a period during which the torque increase control is performed.

As described above, the control device 3 is configured to perform, during upshifting operation, torque increase control in which the output torque Tmg from the rotating electrical machine MG is increased by an amount of increased torque $\Delta$Tmg, so as to compensate for a reduction in the wheel transmission torque Tw caused by a reduction in gear ratio. By performing such torque increase control, a change in vehicle behavior caused by the reduction in the wheel transmission torque Tw can be suppressed to a small level during the upshifting operation; however, depending on an operating point of the rotating electrical machine MG at a point in time when it is determined to perform upshifting, the output torque Tmg from the rotating electrical machine MG may not be able to be sufficiently increased due to limitations on maximum torque Tmax that can be outputted from the rotating electrical machine MG, and there is a possibility that a change in vehicle behavior sensed by the occupant of the vehicle 4 increases.

In view of this respect, the control device 3 is configured such that when the output torque Tmg from the rotating electrical machine MG is greater than determination torque T1 at a point in time when it is determined to perform upshifting, the control device 3 performs, before starting torque increase control, torque reduction control in which the output torque Tmg from the rotating electrical machine MG is gradually reduced to target torque T2 less than or equal to the determination torque T1, the determination torque T1 being torque obtained by subtracting an amount of increased torque $\Delta$Tmg resulting from the torque increase control from maximum torque Tmax that can be outputted from the rotating electrical machine MG at wheel-based rotational speed. By this, as will be described below with reference to FIG. 5, it is possible to suppress a change in vehicle behavior sensed by the occupant of the vehicle 4 during upshifting operation to a small level, regardless of an operating point of the rotating electrical machine MG at a point in time when it is determined to perform upshifting. Namely, in the present embodiment, the control device 3 is configured such that even in a state in which the output torque Tmg from the rotating electrical machine MG exceeds the determination torque T1 (i.e., even in a state in which the above-described second condition is not satisfied) at a point in time when it is determined to perform upshifting, the control device 3 performs upshifting after performing, before staring torque increase control, torque reduction control in which the output torque Tmg from the rotating electrical machine MG is gradually reduced to the target torque T2 less than or equal to the determination torque T1 (i.e., after implementing a state in which the second condition is satisfied).

FIG. 5 is, as with FIG. 2 according to the above-described first embodiment, a graph representing a travelable range at the first shift speed (1st) which is determined based on the operable range (output characteristic) of the rotating electrical machine MG and the first gear ratio G1 and a travelable range at the second shift speed (2nd) which is determined based on the operable range of the rotating electrical machine MG and the second gear ratio G2, with a horizontal axis being wheel speed V and a vertical axis being wheels' required torque Tr.

As shown in FIG. 5, when an operating point (an operating point determined by the wheel speed V and the wheels' required torque Tr, the same applies hereinafter) upon crossing the transmission line L is an operating point included in a hatched area which is hatched in FIG. 5, as a first operating point 31, the output torque Tmg from the rotating electrical machine MG can be increased by at least an amount of increased torque ΔTmg, with the rotational speed Nmg of the rotating electrical machine MG maintained in a first-shift-speed state. Note that determination torque T1 that determines an upper limit (T1×G1) to the wheels' required torque Tr in the hatched area is torque obtained by subtracting an amount of increased torque ΔTmg resulting from torque increase control from maximum torque Tmax that can be outputted from the rotating electrical machine MG at wheel-based rotational speed and at the first shift speed. On the other hand, when an operating point upon crossing the transmission line L is an operating point not included in the hatched area, as a second operating point 32, the output torque Tmg from the rotating electrical machine MG cannot be increased by an amount of increased torque ΔTmg, with the rotational speed Nmg of the rotating electrical machine MG maintained in a first-shift-speed state.

In view of this respect, the control device 3 is configured such that when the output torque Tmg from the rotating electrical machine MG is greater than the determination torque T1 (e.g., when the operating point is the second operating point 32) at a point in time when it is determined to perform upshifting, the control device 3 performs, before starting torque increase control, torque reduction control in which the output torque Tmg from the rotating electrical machine MG is gradually reduced to target torque T2 less than or equal to the determination torque T1. Namely, the torque increase control starts in a state in which the output torque Tmg from the rotating electrical machine MG is reduced to the target torque T2 (i.e., in a state in which the second condition is satisfied). By this, not only when the output torque Tmg from the rotating electrical machine MG is less than or equal to the determination torque T1 at a point in time when it is determined to perform upshifting, but also when the output torque Tmg from the rotating electrical machine MG is greater than the determination torque T1 at the point in time, in the torque increase control, the output torque Tmg from the rotating electrical machine MG can be increased by an amount of increased torque ΔTmg without subject to limitations on the maximum torque Tmax. Note that in the present embodiment, the control device 3 sets the target torque T2 to be identical to the determination torque T1. Thus, as shown in FIG. 5, when an operating point at a point in time when it is determined to perform upshifting (here, an operating point upon crossing the transmission line L) is the second operating point 32, the output torque Tmg from the rotating electrical machine MG is reduced to the determination torque T1.

As shown in FIG. 5, in the present embodiment, the entire hatched area in which an upper limit to the wheels' required torque Tr is determined by torque based on the determination torque T1 (T1×G1) is included in a third area A3. Specifically, in the present embodiment, since an amount of increased torque ΔTmg resulting from torque increase control is set such that the amount of reduction in torque ΔTw is zero, the hatched area corresponds to an area obtained by extending the vertical axis of the travelable range at the first shift speed (1st) by a factor of (G2/G1) while the scale on the horizontal axis of the travelable range at the first shift speed (1st) is maintained. Thus, as shown in FIG. 5, in an area with a low wheel speed V, an upper limit to the hatched area matches an upper limit to the third area A3. As such, in the present embodiment, the entire hatched area is included in the third area A3, and thus, by reducing the output torque Tmg from the rotating electrical machine MG to at least the determination torque T1 in torque reduction control, regardless of the magnitude of the rotational speed Nmg of the rotating electrical machine MG at a point in time when it is determined to perform upshifting (i.e., regardless of the magnitude of the wheel speed V at a point in time when it is determined to perform upshifting), an operating point of the rotating electrical machine MG which is determined by wheel-based rotational speed and requirement-based torque can fall within the operable range of the rotating electrical machine MG (i.e., a state in which the first condition is satisfied can be implemented) even after shifting the shift speed by the upshifting. Thus, by reducing the output torque Tmg from the rotating electrical machine MG to at least the determination torque T1 in the torque reduction control, torque equivalent to wheel transmission torque Tw at the start of torque increase control can be transmitted to the first wheels W1 even after shifting the shift speed. As such, even in a state in which the output torque Tmg from the rotating electrical machine MG exceeds the determination torque T1 at a point in time when it is determined to perform upshifting, by performing upshifting after performing torque reduction control, the upshifting can be performed in a state in which both the first condition and the second condition are satisfied.

Figure 6:
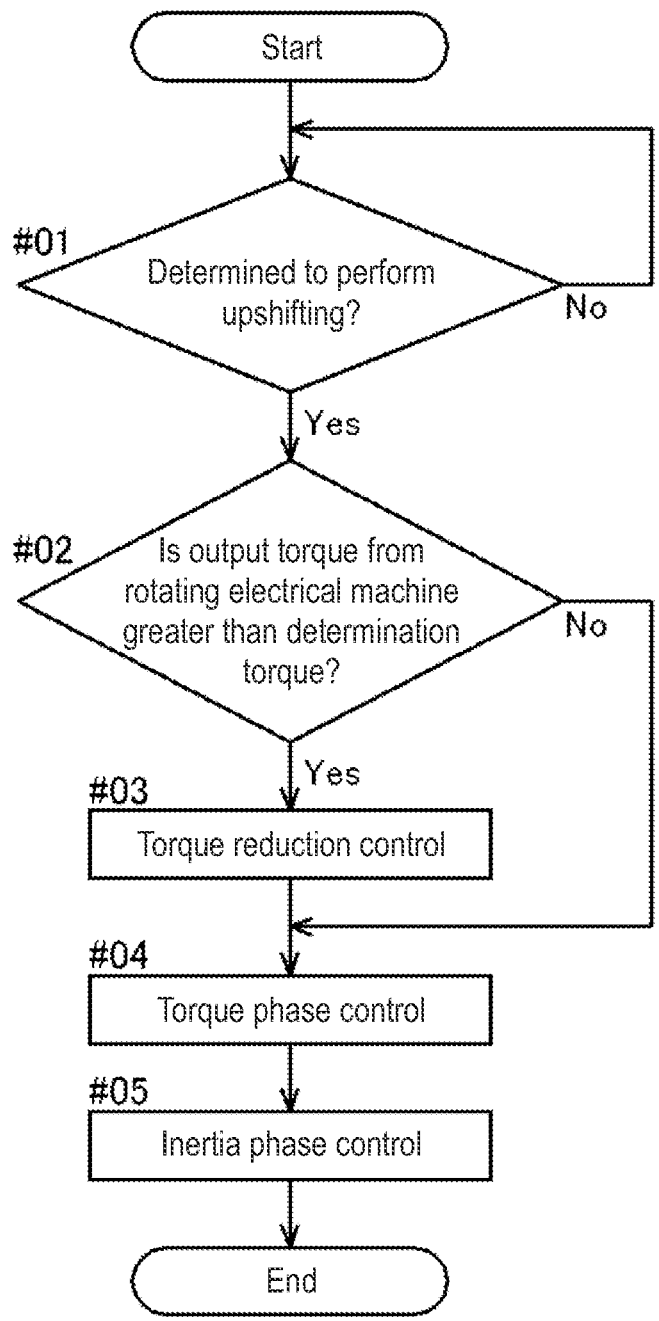
FIG. 6 is a flowchart showing a processing procedure of upshifting control according to the second embodiment.

In the present embodiment, the control device 3 performs upshifting control, following a procedure shown in FIG. 6. When the control device 3 performs at least on-upshifting control, the control device 3 performs upshifting control, following the procedure shown in FIG. 6. Note that the on-upshifting is upshifting performed in a state in which torque in a forward acceleration direction is transmitted to the first wheels W1 (i.e., a state in which the output torque Tmg from the rotating electrical machine MG is a positive torque).

When the control device 3 has determined to perform upshifting (step #01: Yes), the control device 3 determines whether the output torque Tmg from the rotating electrical machine MG is greater than the determination torque T1 (step #02). Then, if the output torque Tmg from the rotating electrical machine MG is greater than the determination torque T1 (step #02: Yes), the control device 3 performs torque reduction control (step #03) and then performs torque phase control (step #04). Namely, the torque reduction control is performed during a period from when it is determined to perform upshifting until a torque phase Pt starts. On the other hand, if the output torque Tmg from the rotating electrical machine MG is less than or equal to the determination torque T1 (step #02: No), the control device 3 performs torque phase control (step #04) without performing torque reduction control (step #03). Then, after finishing the torque phase control (step #04), the control device 3 performs inertia phase control (step #05). The inertia phase control is control for shifting the rotational speed Nmg of the rotating electrical machine MG from a first-shift-speed state to a second-shift-speed state, and when the inertia phase control is finished, the shifting of the shift speed by the upshifting is completed.

Note that the torque phase control at step #04 refers to torque phase control (control for shifting the drive power transmission path in the automatic transmission 2 from a first-shift-speed state to a second-shift-speed state) performed during a torque phase Pt period. Thus, preparation control for starting the torque phase Pt is performed during a period from when it is determined at step #01 to perform upshifting until the torque phase control at step #04 starts. Note that the preparation control is, for example, control for pre-filling hydraulic oil into a hydraulic actuating part (a hydraulic servomechanism, etc.) of an engaged-side engagement device which is engaged to shift a shift speed formed by the automatic transmission 2 from the first shift speed to the second shift speed.

Next, specific operations of upshifting control (here, on-upshifting control) according to the present embodiment will be described with reference to an example shown in FIG. 7. Here, a situation is assumed in which the output torque Tmg from the rotating electrical machine MG is greater than the determination torque T1 at a point in time when it is determined to perform upshifting, and torque reduction control is performed before starting torque increase control. In addition, here, a situation is assumed in which the wheels' required torque Tr is maintained at a constant level during upshifting control.

In the example shown in FIG. 7, at time t0 or a point in time prior to time t0, it is determined to perform upshifting, and torque reduction control starts at time t0. Prior to time t0, the rotating electrical machine MG is controlled to output requirement-based torque. Then, when torque reduction control starts at time t0, the output torque Tmg from the rotating electrical machine MG is controlled to gradually decrease to target torque T2, and accordingly, the wheel transmission torque Tw gradually decreases from the wheels' required torque Tr to the subtracted torque Ts.

In the torque reduction control, the output torque Tmg from the rotating electrical machine MG gradually decreases such that the output torque Tmg from the rotating electrical machine MG reaches the target torque T2 at time t1 which is a point in time when a torque phase Pt starts (in the present embodiment, the same point in time as a point in time when torque increase control starts) or at a point in time prior to time t1. Note that the point in time when the torque phase Pt starts can be predicted, for example, based on a time at which preparation control for starting the torque phase Pt starts and a preparation time period from the start of the preparation control until the start of the torque phase Pt which is obtained by experiment, simulation, etc. In the example shown in FIG. 7, the reduction rate of the output torque Tmg from the rotating electrical machine MG in the torque reduction control is set such that the output torque Tmg from the rotating electrical machine MG reaches the target torque T2 at a point in time when the torque phase Pt starts. By this, it is possible to secure a long period during which the torque reduction control is performed (in the example shown in FIG. 7, the period from time t0 to time t1) and suppress the reduction rate of the output torque Tmg from the rotating electrical machine MG to a small level (i.e., to suppress a change in vehicle behavior sensed by the occupant of the vehicle 4 during the period during which the torque reduction control is performed to a small level). In the example shown in FIG. 7, the period during which the torque reduction control is performed is secured to be longer than the torque phase Pt period. Note that in this specification the magnitude of the reduction rate of the output torque Tmg from the rotating electrical machine MG and the magnitude of the reduction rate of the wheel transmission torque Tw which will be described later are absolute values.

In the example shown in FIG. 7, the torque phase Pt starts at time t1. Namely, at time t1, shifting of the drive power transmission path in the automatic transmission 2 from a first-shift-speed state to a second-shift-speed state starts. In the present embodiment, an engaged-side engagement device which is engaged when a shift speed formed by the automatic transmission 2 shifts from the first shift speed to the second shift speed is a friction engagement device such as a multiplate wet clutch or a multiplate wet brake. At a point in time prior to time t1, control for engaging the engaged-side engagement device starts, and at and after time t1, shifting of the drive power transmission path in the automatic transmission 2 from a first-shift-speed state to a second-shift-speed state proceeds along with an increase in the engagement pressure of the engaged-side engagement device (an increase in transmission torque capacity). Namely, by performing the above-described preparation control at a point in time prior to time t1, at time t1 the engaged-side engagement device starts to have torque capacity. In the present embodiment, torque reduction control is performed using a period before the engaged-side engagement device thus starts to have torque capacity (in the example shown in FIG. 7, a period prior to time t1).

As indicated by a broken line in FIG. 7, at and after time t1, when the output torque Tmg from the rotating electrical machine MG is maintained at a constant level, the wheel transmission torque Tw decreases according to an increase in torque ratio. Here, the torque ratio is a ratio of input torque inputted to the automatic transmission 2 from the input member 20 to output torque outputted to the output member 21 from the automatic transmission 2. On the other hand, in the present embodiment, since torque increase control is performed in the torque phase Pt, the reduction in the wheel transmission torque Tw caused by the increase in torque ratio can be compensated for by an increase in the output torque Tmg from the rotating electrical machine MG. As described above, in the present embodiment, since an amount of increased torque ΔTmg of the rotating electrical machine MG resulting from the torque increase control is set such that the amount of reduction in torque ΔTw is zero, as indicated by a solid line in FIG. 7, the wheel transmission torque Tw can be maintained at the subtracted torque Ts during a period from the start to end of the torque phase Pt. Note that when torque reduction control is not performed, the wheel transmission torque Tw is maintained at the wheels' required torque Tr during a period from the start to end of the torque phase Pt. In the example shown in FIG. 7, the torque increase control starts at a point in time when the torque phase Pt starts (time t1 in FIG. 7) and the torque increase control ends at a point in time when the torque phase Pt ends (time t2 in FIG. 7). In addition, in the example shown in FIG. 7, in the torque increase control, the output torque Tmg from the rotating electrical machine MG gradually increases such that the amount of increase in the output torque Tmg from the rotating electrical machine MG is an amount of increased torque ΔTmg at a point in time when the torque increase control ends (here, at a point of time when the torque phase Pt ends). Namely, the output torque Tmg from the rotating electrical machine MG increases in accordance with an increase in torque ratio.

As shown in FIG. 7, when the torque phase Pt ends at time t2, an inertia phase Pi during which the rotational speed Nmg of the rotating electrical machine MG shifts from a first-shift-speed state to a second-shift-speed state starts. In the inertia phase Pi, the rotational speed Nmg of the rotating electrical machine MG is reduced to a point where the rotational speed Nmg of the rotating electrical machine MG shifts to the second-shift-speed state by, for example, reducing the output torque Tmg from the rotating electrical machine MG or increasing the engagement pressure of the engaged-side engagement device. In the example shown in FIG. 7, in the inertia phase Pi, the output torque Tmg from the rotating electrical machine MG is controlled such that the wheel transmission torque Tw gradually increases to the wheels' required torque Tr. Namely, the output torque Tmg from the rotating electrical machine MG is controlled such that the wheel transmission torque Tw gradually increases to the wheels' required torque Tr while suppressing a sudden increase in the wheel transmission torque Tw caused by inertial torque of each part in the rotating electrical machine MG and the automatic transmission 2. Then, when the rotational speed Nmg of the rotating electrical machine MG shifts to the second-shift-speed state at time t3, the shifting of the shift speed by upshifting is completed, and at and after time t3 which is after shifting the shift speed, the rotating electrical machine MG is controlled to output requirement-based torque, with the second shift speed formed by the automatic transmission 2. Note that although here a case is exemplified in which the wheel transmission torque Tw reaches the wheels' required torque Tr at a point in time when the inertia phase Pi ends, the output torque Tmg from the rotating electrical machine MG may be controlled such that the wheel transmission torque Tw reaches the wheels' required torque Tr before the inertia phase Pi ends. Note also that the output torque Tmg from the rotating electrical machine MG may be controlled such that the wheel transmission torque Tw reaches the wheels' required torque Tr after the inertia phase Pi ends. In this case, the output torque Tmg from the rotating electrical machine MG may be controlled such that the wheel transmission torque Tw is maintained at the subtracted torque Ts in the inertia phase Pi and an increase in the wheel transmission torque Tw starts after the inertia phase Pi ends.

As shown in FIG. 7, the reduction rate of the output torque Tmg from the rotating electrical machine MG in the torque reduction control is set such that the reduction rate of the wheel transmission torque Tw associated with the reduction in the output torque Tmg from the rotating electrical machine MG is smaller than the reduction rate of the wheel transmission torque Tw in the torque phase Pt at a time when torque increase control is not performed (see a broken line in FIG. 7). Note that the reduction rate of the output torque Tmg from the rotating electrical machine MG in the torque reduction control may be constant over the entire period during which the torque reduction control is performed as indicated by a broken line in FIG. 8, but may change according to elapsed time from the start of the torque reduction control as indicated by a solid line in FIG. 8.

Figure 8:
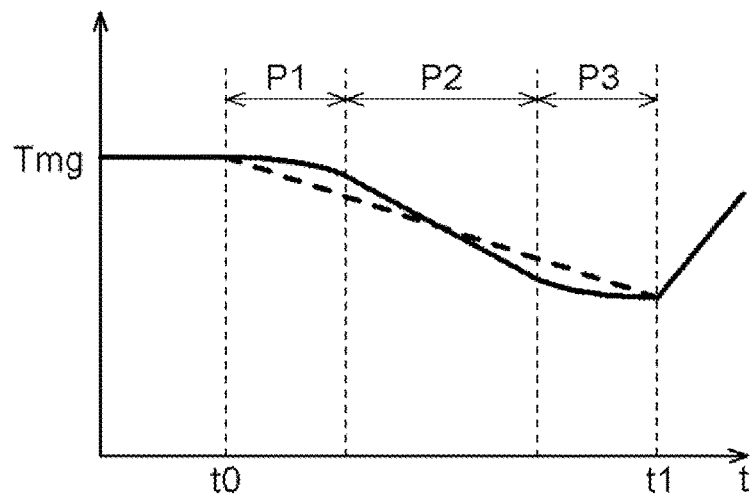
FIG. 8 is a time chart showing exemplary control of output torque from a rotating electrical machine in torque reduction control according to the second embodiment.

In an example shown in FIG. 8, the reduction rates of the output torque Tmg from the rotating electrical machine MG in a start period P1 and an end period P3 of a period during which the torque reduction control is performed are smaller than the reduction rate of the output torque Tmg from the rotating electrical machine MG in a middle period P2 between the start period P1 and the end period P3 of the period during which the torque reduction control is performed. Note that a comparison between the reduction rates of the output torque Tmg from the rotating electrical machine MG in the respective periods, the start period P1, the middle period P2, and the end period P3, may be made using, for example, the average values of the reduction rates in the respective periods. By thus setting the reduction rates of the output torque Tmg from the rotating electrical machine MG in the torque reduction control, a change in the output torque Tmg from the rotating electrical machine MG associated with performance of the torque reduction control is smoothed, by which a change in vehicle behavior sensed by the occupant of the vehicle 4 can be suppressed to a smaller level. In the example shown in FIG. 8, in the start period P1 the reduction rate (the reduction rate of the output torque Tmg from the rotating electrical machine MG, the same applies hereinafter) increases with the passage of time, in the middle period P2 the reduction rate is maintained at a constant level, and in the end period P3 the reduction rate decreases with the passage of time. Note that the configuration may be such that in the middle period P2, too, the reduction rate changes with the passage of time. Specifically, a configuration can be adopted in which the reduction rate increases with the passage of time in a first-half portion of the middle period P2, and the reduction rate decreases with the passage of time in a second-half portion of the middle period P2.

Other Embodiments

Next, other embodiments of a control device will be described.

(1) The above-described first embodiment describes, as an example, a configuration in which even when the output torque Tmg from the rotating electrical machine MG exceeds the determination torque T1, if the wheel speed V has reached the set threshold value V1 from the low-speed side, then the control device 3 performs upshifting without performing torque increase control. However, the configuration is not limited thereto, and a configuration can also be adopted in which even in upshifting performed in such a case, the control device 3 performs torque increase control to increase the output torque Tmg from the rotating electrical machine MG as much as possible (increase the output torque Tmg to the maximum torque Tmax). The amount of increase in the output torque Tmg from the rotating electrical machine MG in this case has a smaller value than a set amount of increased torque ΔTmg (in the above-described first embodiment, an amount of increased torque for bringing the amount of reduction in torque ΔTw to zero).

(2) The above-described first embodiment describes, as an example, a configuration in which in torque increase control, the control device 3 controls the output torque Tmg from the rotating electrical machine MG such that the wheel transmission torque Tw is maintained at the wheels' required torque Tr during upshifting operation. However, the configuration is not limited thereto, and a configuration can also be adopted in which an amount of increased torque ΔTmg of the rotating electrical machine MG resulting from torque increase control is set to be smaller than the value of the above-described first embodiment, and although the wheel transmission torque Tw is reduced from the wheels' required torque Tr during upshifting operation (specifically, in a torque phase Pt period), the amount of reduction in the wheel transmission torque Tw from the wheels' required torque Tr is suppressed to a small level by performing torque increase control.

(3) The above-described second embodiment describes, as an example, a configuration in which the control device 3 sets the target torque T2 to be identical to the determination torque T1. However, the configuration is not limited thereto, and a configuration can also be adopted in which the control device 3 sets the target torque T2 to be less than the determination torque T1. In a case of such a configuration, a configuration can also be adopted in which the control device 3 sets the target torque T2 to be less than the determination torque T1 when a determination condition is satisfied. For example, a configuration can be adopted in which when the determination torque T1 is greater than allowable torque T3 which is torque represented by (T×G2/G1) in which T is maximum torque Tmax that can be outputted from the rotating electrical machine MG at wheel-based rotational speed after shifting the shift speed by upshifting, G1 is the gear ratio at the first shift speed, and G2 is the gear ratio at the second shift speed, the control device 3 sets the target torque T2 to be less than or equal to the allowable torque T3 (i.e., less than the determination torque T1). A specific example of such a configuration is shown in FIG. 9.

Figure 9:
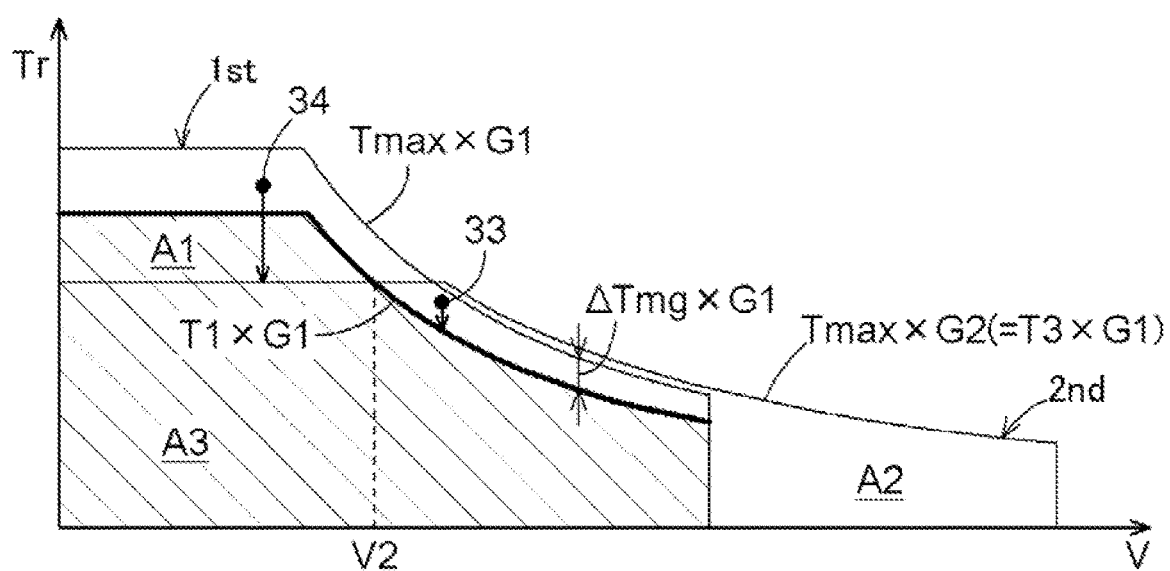
FIG. 9 is a diagram showing another example of travelable ranges at the first shift speed and the second shift speed according to the second embodiment.

In the example shown in FIG. 9, an amount of increased torque ΔTmg of the rotating electrical machine MG resulting from torque increase control is set to be smaller than the value of the above-described second embodiment. Hence, in the example shown in FIG. 9, a hatched area in which an upper limit to the wheels' required torque Tr is determined by torque based on the determination torque T1 (T1×G1) is extended toward a side on which the wheels' required torque Tr increases, compared to the hatched area of the above-described second embodiment (see FIG. 5). As a result, in the above-described second embodiment, the determination torque T1 is less than or equal to the allowable torque T3 regardless of the magnitude of the wheel speed V, whereas in the example shown in FIG. 9, the determination torque T1 is greater than the allowable torque T3 in an area in which the wheel speed V is less than a wheel speed threshold value V2.

In such a case, a configuration can be adopted in which when the determination torque T1 is less than or equal to the allowable torque T3 in a case in which the output torque Tmg from the rotating electrical machine MG is greater than the determination torque T1 at a point in time when it is determined to perform upshifting, the control device 3 sets the target torque T2 to be less than or equal to the determination torque T1 (e.g., sets the target torque T2 to be identical to the determination torque T1), and when the determination torque T1 is greater than the allowable torque T3, the control device 3 sets the target torque T2 to be less than or equal to the allowable torque T3 (e.g., sets the target torque T2 to be identical to the allowable torque T3). In this case, when an operating point (an operating point determined by the wheel speed V and the wheels' required torque Tr, the same applies hereinafter) at a point in time when it is determined to perform upshifting is an operating point in which the wheel speed V is greater than or equal to the wheel speed threshold value V2 and which is not included in the hatched area, as a third operating point 33 shown in FIG. 9, the output torque Tmg from the rotating electrical machine MG is reduced to less than or equal to the determination torque T1 (in the example shown in FIG. 9, to the determination torque T1). In addition, when an operating point at a point in time when it is determined to perform upshifting is an operating point in which the wheel speed V is less than the wheel speed threshold value V2 and which is not included in the hatched area, as a fourth operating point 34 shown in FIG. 9, the output torque Tmg from the rotating electrical machine MG is reduced to less than or equal to the allowable torque T3 (in the example shown in FIG. 9, to the allowable torque T3). By such a configuration, as in the above-described second embodiment, regardless of the magnitude of the rotational speed Nmg of the rotating electrical machine MG at a point in time when it is determined to perform upshifting (i.e., regardless of the magnitude of the wheel speed V at a point in time when it is determined to perform upshifting), an operating point of the rotating electrical machine MG determined by wheel-based rotational speed and requirement-based torque can fall within an operable range of the rotating electrical machine MG even after shifting the shift speed by the upshifting.

(4) The above-described second embodiment describes, as an example, a configuration in which in torque increase control, the control device 3 controls the output torque Tmg from the rotating electrical machine MG such that the wheel transmission torque Tw is maintained at object torque (the wheels' required torque Tr or the subtracted torque Ts). However, the configuration is not limited thereto, and a configuration can also be adopted in which an amount of increased torque ΔTmg of the rotating electrical machine MG resulting from torque increase control is set to be smaller than the value of the above-described second embodiment, and although the wheel transmission torque Tw is reduced from the object torque in a torque phase Pt period, the amount of reduction in the wheel transmission torque Tw from the object torque is suppressed to a small level by performing torque increase control.

(5) The above-described first and second embodiments describe, as an example, a configuration in which the vehicle drive device 1 does not include any other drive power source for the first wheels W1 than the rotating electrical machine MG, and does not include a drive power source for the second wheels W2, either. However, the configuration is not limited thereto, and it is also possible to adopt a configuration in which the vehicle drive device 1 includes a drive power source (e.g., an internal combustion engine) for the first wheels W1 separately from the rotating electrical machine MG, or a configuration in which the vehicle drive device 1 includes a drive power source (e.g., a rotating electrical machine or an internal combustion engine) for the second wheels W2. In a case of such configurations, a configuration can be adopted in which the control device 3 performs the above-described torque increase control not only during performance of an electric travel mode in which the vehicle 4 travels using only the output torque Tmg from the rotating electrical machine MG, but also in a state in which the vehicle 4 travels by transmitting both the output torque Tmg from the rotating electrical machine MG and output torque from another drive power source to wheels (only the first wheels W1 or both the first wheels W1 and the second wheels W2).

(6) The above-described first and second embodiments describe, as an example, a configuration in which the power transmission path is provided so as to connect the rotating electrical machine MG to the two left and right first wheels W1. However, the configuration is not limited thereto, and for example, a configuration can also be adopted in which a power transmission path is provided so as to connect the rotating electrical machine MG to one first wheel W1. In this case, a configuration can be adopted in which at least a part of the case of the rotating electrical machine MG is disposed in space on a radial inner side of the first wheel W1 (i.e., a configuration in which the rotating electrical machine MG is an in-wheel type rotating electrical machine).

(7) Note that a configuration disclosed in each of the above-described embodiments can also be applied in combination with a configuration disclosed in another embodiment (including a combination of embodiments described as other embodiments) as long as a contradiction does not arise. For other configurations, too, the embodiments disclosed in this specification are in all respects merely illustrative. Thus, various modifications can be made therein as appropriate without departing from the true spirit and scope of the present disclosure.

Summary of the Above-Described Embodiments

A summary of the control devices described above will be described below.

In a control device (3) whose control target is a vehicle drive device (1) having an automatic transmission (2) provided in a power transmission path that connects a rotating electrical machine (MG) to a wheel (W), the control device (3) is configured such that when the control device (3) performs upshifting, the control device (3) performs, during operation of the upshifting, torque increase control in which output torque (Tmg) from the rotating electrical machine (MG) is increased so as to compensate for a reduction in wheel transmission torque (Tw) caused by a reduction in gear ratio, the upshifting being shifting of a shift speed formed by the automatic transmission (2) from a first shift speed to a second shift speed having a smaller gear ratio than the first shift speed, and the wheel transmission torque (Tw) being torque transmitted from the rotating electrical machine (MG) to the wheel (W) through the automatic transmission (2), and the upshifting is performed in a state in which an operating point of the rotating electrical machine (MG) for outputting requirement-based torque at wheel-based rotational speed falls within an operable range of the rotating electrical machine (MG) both before and after shifting the shift speed by the upshifting, and in which before shifting the shift speed, output torque (Tmg) from the rotating electrical machine (MG) is less than or equal to determination torque (T1), the wheel-based rotational speed being rotational speed (Nmg) of the rotating electrical machine (MG) based on rotational speed (V) of the wheel (W), the requirement-based torque being output torque (Tmg) from the rotating electrical machine (MG) based on the required wheel transmission torque (Tw), and the determination torque (T1) being torque obtained by subtracting an amount of increased torque (ΔTmg) resulting from the torque increase control from maximum torque (Tmax) that can be outputted from the rotating electrical machine (MG) at the wheel-based rotational speed.

According to this configuration, by performing torque increase control during upshifting operation, a reduction in the wheel transmission torque (Tw) caused by a reduction in gear ratio can be compensated for by an increase in the output torque (Tmg) from the rotating electrical machine (MG). In the above-described configuration, the state of the rotating electrical machine (MG) upon performing upshifting is a state in which the following two conditions, a first condition and a second condition, are satisfied. Here, the first condition is that an operating point of the rotating electrical machine (MG) for outputting requirement-based torque at wheel-based rotational speed falls within an operable range of the rotating electrical machine (MG) both before and after shifting the shift speed by the upshifting, and the second condition is that before shifting the shift speed, the output torque (Tmg) from the rotating electrical machine (MG) is in a state of being less than or equal to determination torque (T1) which is torque obtained by subtracting an amount of increased torque (ΔTmg) resulting from the torque increase control from maximum torque (Tmax) that can be outputted from the rotating electrical machine (MG) at wheel-based rotational speed. As such, by the state of the rotating electrical machine (MG) upon performing upshifting being a state in which the second condition is satisfied in addition to the first condition, in torque increase control performed during upshifting operation, the output torque (Tmg) from the rotating electrical machine (MG) can be increased by the amount of increased torque (ΔTmg) without subject to limitations on the maximum torque (Tmax). As a result, upon performing upshifting, a reduction in wheel transmission torque (Tw) caused by a reduction in gear ratio can be appropriately compensated for by an increase in output torque (Tmg) from the rotating electrical machine (MG).

Here, it is preferred that the upshifting not be performed in a state in which at least one of a first condition and a second condition is not satisfied, the first condition being that an operating point of the rotating electrical machine (MG) for outputting the requirement-based torque at the wheel-based rotational speed falls within an operable range of the rotating electrical machine (MG) both before and after shifting the shift speed by the upshifting, and the second condition being that before shifting the shift speed, output torque (Tmg) from the rotating electrical machine (MG) is less than or equal to the determination torque (T1).

When upshifting is performed in a state in which the first condition is not satisfied, for example, torque equivalent to wheel transmission torque (Tw) before shifting the shift speed may not be able to be transmitted to the wheel (W1) after shifting the shift speed, and there is a possibility that a change in vehicle behavior sensed by an occupant of a vehicle (4) increases. In addition, when upshifting is performed in a state in which the second condition is not satisfied, in torque increase control performed during upshifting operation, output torque (Tmg) from the rotating electrical machine (MG) may not be able to be sufficiently increased due to limitations on the maximum torque, and there is a possibility that a change in vehicle behavior sensed by the occupant of the vehicle (4) increases. In the above-described configuration, since upshifting is not performed in a state in which the first condition is not satisfied or in a state in which the second condition is not satisfied, it becomes easy to avoid the occupant of the vehicle (4) from sensing a great change in vehicle behavior.

In addition, it is preferred that even when output torque (Tmg) from the rotating electrical machine (MG) exceeds the determination torque (T1), if rotational speed (V) of the wheel (W) has reached a set threshold value (V1) from a low-speed side, then the upshifting be performed without performing the torque increase control, and the set threshold value (V1) be set to be less than or equal to a wheel speed upper limit value (Vmax), the wheel speed upper limit value (Vmax) being rotational speed (V) of the wheel (W) based on an upper rotational speed limit of the rotating electrical machine (MG), with the first shift speed formed by the automatic transmission (2).

According to this configuration, the configuration can be such that upshifting from the first shift speed to the second shift speed is performed before the rotational speed (Nmg) of the rotating electrical machine (MG) exceeds the upper rotational speed limit of the rotating electrical machine (MG) with the first shift speed formed by the automatic transmission (2). Thus, in a configuration in which, as described above, the state of the rotating electrical machine (MG) upon performing upshifting is a state in which the second condition is satisfied in addition to the first condition, too, the configuration can be such that upshifting is performed before the rotational speed (Nmg) of the rotating electrical machine (MG) gets too high.

In a configuration in which, as described above, the set threshold value (V1) is set to be less than or equal to the wheel speed upper limit value (Vmax), it is preferred that the set threshold value (V1) be set to rotational speed (V) of the wheel (W) at which vibration caused by travel of a vehicle (4) on which the vehicle drive device (1) is mounted is greater than or equal to vibration caused by the upshifting in which the torque increase control is not performed.

According to this configuration, when upshifting is performed without performing torque increase control because the rotational speed (V) of the wheel (W) has reached the set threshold value (V1) from the low-speed side, a change in vehicle behavior caused by a reduction in wheel transmission torque can be blended into vibration caused by travel of the vehicle (4). Thus, even in a configuration in which upshifting is performed without performing torque increase control when the rotational speed (V) of the wheel (W) has reached the set threshold value (V1) from the low-speed side, it is possible to make it difficult for the occupant of the vehicle (4) such as a driver to sense a change in vehicle behavior caused by the upshifting.

In the control device (3) having the above-described configurations, it is preferred that in the torque increase control, output torque (Tmg) from the rotating electrical machine (MG) be controlled such that the wheel transmission torque (Tw) is maintained at required torque (Tr) during the operation of the upshifting.

According to this configuration, since the wheel transmission torque (Tw) can be maintained at required torque (Tr) while torque increase control is performed, a change in vehicle behavior caused by the wheel transmission torque (Tw) changing from the required torque (Tr) can be suppressed to a small level.

In a configuration in which, as described above, in the torque increase control, output torque (Tmg) from the rotating electrical machine (MG) is controlled such that the wheel transmission torque (Tw) is maintained at required torque (Tr) during the operation of the upshifting, it is preferred that the operation of the upshifting include a torque phase (Pt) which is a period during which a drive power transmission path in the automatic transmission (2) shifts from a state of the first shift speed to a state of the second shift speed, with rotational speed (Nmg) of the rotating electrical machine (MG) maintained in a state of the first shift speed; and an inertia phase (Pi) which is a period during which rotational speed (Nmg) of the rotating electrical machine (MG) shifts from the state of the first shift speed to a state of the second shift speed after the torque phase (Pt), the torque increase control be performed in the torque phase (Pt), and output torque (Tmg) from the rotating electrical machine (MG) having been increased by the torque increase control be torque based on (T×G1/G2) in which T is the requirement-based torque before starting the torque phase (Pt), G1 is a gear ratio of the first shift speed, and G2 is a gear ratio of the second shift speed.

According to this configuration, output torque (Tmg) from the rotating electrical machine (MG) having been increased by torque increase control can be set such that the amount of reduction (ΔTw) in the wheel transmission torque (Tw) caused by a reduction in gear ratio is zero or has a value close to zero. Thus, a configuration in which, as described above, in torque increase control, the output torque (Tmg) from the rotating electrical machine (MG) is controlled such that the wheel transmission torque (Tw) is maintained at required torque can be appropriately implemented.

In addition, it is preferred that even in a state in which output torque (Tmg) from the rotating electrical machine (MG) exceeds the determination torque (T1) at a point in time when it is determined to perform the upshifting, torque reduction control in which the output torque (Tmg) from the rotating electrical machine (MG) is gradually reduced to target torque (T2) less than or equal to the determination torque (T1) be performed before starting the torque increase control, and then the upshifting be performed.

In the above-described configuration, when the output torque (Tmg) from the rotating electrical machine (MG) is greater than the determination torque (T1) at a point in time when it is determined to perform upshifting, torque reduction control is performed before starting torque increase control, by which the output torque (Tmg) from the rotating electrical machine (MG) is reduced to the target torque (T2) less than or equal to the determination torque (T1). Thus, not only when the output torque (Tmg) from the rotating electrical machine (MG) is less than or equal to the determination torque (T1) at a point in time when it is determined to perform upshifting, but also when the output torque (Tmg) from the rotating electrical machine (MG) is greater than the determination torque (T1) at the point in time, in torque increase control, the output torque (Tmg) from the rotating electrical machine (MG) can be increased by an amount of increased torque (ΔTmg) without subject to limitations on the maximum torque (Tmax), and a change in vehicle behavior sensed by the occupant of the vehicle (4) can be suppressed to a small level. Namely, even in a state in which the output torque (Tmg) from the rotating electrical machine (MG) exceeds the determination torque (T1) at a point in time when it is determined to perform upshifting, by performing torque reduction control before starting torque increase control and then performing upshifting, upon performing the upshifting, a reduction in the wheel transmission torque (Tw) caused by a reduction in gear ratio can be appropriately compensated for by an increase in the output torque (Tmg) from the rotating electrical machine (MG).

Note that in torque reduction control performed when the output torque (Tmg) from the rotating electrical machine (MG) is greater than the determination torque (T1), the output torque (Tmg) from the rotating electrical machine (MG) is gradually reduced to the target torque (T2). Thus, compared to a case in which the output torque (Tmg) from the rotating electrical machine (MG) is reduced to the target torque (T2) in a stepwise manner in torque reduction control, the output torque (Tmg) from the rotating electrical machine (MG) can be reduced to the target torque (T2) while suppressing a change in vehicle behavior sensed by the occupant of the vehicle (4) to a small level. Namely, during upshifting operation, not only in a period during which torque increase control is performed but also in a period during which torque reduction control is performed, a change in vehicle behavior sensed by the occupant of the vehicle (4) can be suppressed to a small level.

As described above, according to the above-described configuration, it becomes possible to suppress a change in vehicle behavior sensed by the occupant of the vehicle (4) during upshifting operation to a small level, regardless of an operating point of the rotating electrical machine (MG) at a point in time when it is determined to perform upshifting.

Here, it is preferred that the target torque (T2) be set to be identical to the determination torque (T1).

According to this configuration, compared to a case in which the target torque (T2) is set to be less than the determination torque (T1), the amount of reduction in output torque (Tmg) from the rotating electrical machine (MG) in torque reduction control can be suppressed to a small level. Thus, a change in vehicle behavior can be easily suppressed to a small level in a period during which the torque reduction control is performed, and the amount of reduction in wheel transmission torque (Tw) relative to required torque (Tr) caused by performing the torque reduction control can also be suppressed to a minimum.

Alternatively, it is preferred that when the determination torque (T1) is greater than allowable torque (T3), the target torque (T2) be set to be less than or equal to the allowable torque (T3), the allowable torque (T3) being torque represented by (T×G2/G1) in which T is maximum torque (Tmax) that can be outputted from the rotating electrical machine (MG) at the wheel-based rotational speed after shifting the shift speed by the upshifting, G1 is a gear ratio of the first shift speed, and G2 is a gear ratio of the second shift speed.

According to this configuration, in a situation in which the determination torque (T1) is greater than the allowable torque (T3), by setting the target torque (T2) to be less than or equal to the allowable torque (T3), torque equivalent to wheel transmission torque (Tw) at the start of torque increase control can be transmitted to the wheel (W1) even after shifting the shift speed. Thus, in a situation in which the determination torque (T1) is greater than the allowable torque (T3), too, a change in the wheel transmission torque (Tr) during upshifting operation is suppressed to a small level, making it possible to suppress a change in vehicle behavior sensed by the occupant of the vehicle (4) to a small level.

In the control device (3) having the above-described configurations, it is preferred that the operation of the upshifting include a torque phase (Pt) which is a period during which a drive power transmission path in the automatic transmission (2) shifts from a state of the first shift speed to a state of the second shift speed, with rotational speed (Nmg) of the rotating electrical machine (MG) maintained in a state of the first shift speed; and an inertia phase (Pi) which is a period during which rotational speed (Nmg) of the rotating electrical machine (MG) shifts from the state of the first shift speed to a state of the second shift speed after the torque phase (Pt), the torque increase control be performed in the torque phase (Pt), and the torque reduction control be performed during a period from when it is determined to perform the upshifting until the torque phase (Pt) starts.

According to this configuration, torque reduction control can be performed using a period from when it is determined to perform upshifting until the torque phase (Pt) starts, as a period before an engaged-side engagement device which is engaged to shift the shift speed starts to have torque capacity. Thus, a reduction in transmission responsiveness caused by performing the torque reduction control can be suppressed.

In addition, it is preferred that in the torque reduction control, reduction rates of output torque (Tmg) from the rotating electrical machine (MG) in a start period (P1) and an end period (P3) of a period during which the torque reduction control is performed be smaller than a reduction rate of output torque (Tmg) from the rotating electrical machine (MG) in a middle period (P2) between the start period (P1) and the end period (P3) of the period during which the torque reduction control is performed.

According to this configuration, compared to a case in which the reduction rate of output torque (Tmg) from the rotating electrical machine (MG) is constant over the entire period during which torque reduction control is performed, a change in output torque (Tmg) from the rotating electrical machine (MG) associated with performance of torque reduction control can be smoothed. Thus, a change in vehicle behavior sensed by the occupant of the vehicle (4) can be suppressed to a smaller level.

It is sufficient that the control device according to the present disclosure be able to provide at least one of the above-described advantageous effects.

REFERENCE SIGNS LIST

1: Vehicle drive device, 2: Automatic transmission, 3: Control device, 4: Vehicle, MG: Rotating electrical machine, Nmg: Rotational speed of the rotating electrical machine, P1: Start period, P2: Middle period, P3: End period, Pi: Inertia phase, Pt: Torque phase, T1: Determination torque, T2: Target torque, T3: Allowable torque, Tmax: Maximum torque, Tmg: Output torque from the rotating electrical machine, Tw: Wheel transmission torque, V: Wheel speed (rotational speed of wheels), V1: Set threshold value, Vmax: Wheel speed upper limit value, W1: First wheel (wheel), and ΔTmg: Amount of increased torque

The invention claimed is:

1. A control device whose control target is a vehicle drive device having an automatic transmission provided in a power transmission path that connects a rotating electrical machine to a wheel,
wherein
the control device is configured such that when the control device performs upshifting, the control device performs, during operation of the upshifting, torque increase control in which output torque from the rotating electrical machine is increased so as to compensate for a reduction in wheel transmission torque caused by a reduction in gear ratio, the upshifting being shifting of a shift speed formed by the automatic transmission from a first shift speed to a second shift speed having a smaller gear ratio than the first shift speed, and the wheel transmission torque being torque transmitted from the rotating electrical machine to the wheel through the automatic transmission, and
the upshifting is performed in a state in which an operating point of the rotating electrical machine for outputting requirement-based torque at wheel-based rotational speed falls within an operable range of the rotating electrical machine both before and after shifting the shift speed by the upshifting, and in which before shifting the shift speed, output torque from the rotating electrical machine is less than or equal to determination torque, the wheel-based rotational speed being rotational speed of the rotating electrical machine based on rotational speed of the wheel, the requirement-based torque being output torque from the rotating electrical machine based on the required wheel transmission torque, and the determination torque being torque obtained by subtracting an amount of increased torque resulting from the torque increase control from maximum torque that can be outputted from the rotating electrical machine at the wheel-based rotational speed.

2. The control device according to claim 1, wherein the upshifting is not performed in a state in which at least one of a first condition and a second condition is not satisfied, the first condition being that an operating point of the rotating electrical machine for outputting the requirement-based torque at the wheel-based rotational speed falls within an operable range of the rotating electrical machine both before and after shifting the shift speed by the upshifting, and the second condition being that before shifting the shift speed, output torque from the rotating electrical machine is less than or equal to the determination torque.

3. The control device according to claim 1, wherein
even when output torque from the rotating electrical machine exceeds the determination torque, if rotational speed of the wheel has reached a set threshold value from a low-speed side, then the upshifting is performed without performing the torque increase control, and
the set threshold value is set to be less than or equal to a wheel speed upper limit value, the wheel speed upper limit value being rotational speed of the wheel based on an upper rotational speed limit of the rotating electrical machine, with the first shift speed formed by the automatic transmission.

4. The control device according to claim 3, wherein the set threshold value is set to rotational speed of the wheel at which vibration caused by travel of a vehicle on which the vehicle drive device is mounted is greater than or equal to vibration caused by the upshifting in which the torque increase control is not performed.

5. The control device according to claim 1, wherein in the torque increase control, output torque from the rotating electrical machine is controlled such that the wheel transmission torque is maintained at required torque during the operation of the upshifting.

6. The control device according to claim 5, wherein
the operation of the upshifting includes a torque phase and an inertia phase, the torque phase being a period during which a drive power transmission path in the automatic transmission shifts from a state of the first shift speed to a state of the second shift speed, with rotational speed of the rotating electrical machine maintained in a state of the first shift speed, and the inertia phase being a period during which rotational speed of the rotating electrical machine shifts from the state of the first shift speed to a state of the second shift speed after the torque phase,
the torque increase control is performed in the torque phase, and
output torque from the rotating electrical machine having been increased by the torque increase control is torque based on (T×G1/G2) in which T is the requirement-based torque before starting the torque phase, G1 is a gear ratio of the first shift speed, and G2 is a gear ratio of the second shift speed.

7. The control device according to claim 1, wherein even in a state in which output torque from the rotating electrical machine exceeds the determination torque at a point in time when it is determined to perform the upshifting, torque reduction control in which the output torque from the rotating electrical machine is gradually reduced to target torque less than or equal to the determination torque is performed before starting the torque increase control, and then the upshifting is performed.

8. The control device according to claim 7, wherein the target torque is set to be identical to the determination torque.

9. The control device according to claim 7, wherein when the determination torque is greater than allowable torque, the target torque is set to be less than or equal to the allowable torque, the allowable torque being torque represented by (T×G2/G1) in which T is maximum torque that can be outputted from the rotating electrical machine at the wheel-based rotational speed after shifting the shift speed by the upshifting, G1 is a gear ratio of the first shift speed, and G2 is a gear ratio of the second shift speed.

10. The control device according to claim 7, wherein
the operation of the upshifting includes a torque phase and an inertia phase, the torque phase being a period during which a drive power transmission path in the automatic transmission shifts from a state of the first shift speed to a state of the second shift speed, with rotational speed of the rotating electrical machine maintained in a state of the first shift speed, and the inertia phase being a period during which rotational speed of the rotating electrical machine shifts from the state of the first shift speed to a state of the second shift speed after the torque phase,
the torque increase control is performed in the torque phase, and
the torque reduction control is performed during a period from when it is determined to perform the upshifting until the torque phase starts.

11. The control device according to claim 7, wherein in the torque reduction control, reduction rates of output torque from the rotating electrical machine in a start period and an end period of a period during which the torque reduction control is performed are smaller than a reduction rate of output torque from the rotating electrical machine in a middle period between the start period and the end period of the period during which the torque reduction control is performed.

12. The control device according to claim 2, wherein in the torque increase control, output torque from the rotating electrical machine is controlled such that the wheel transmission torque is maintained at required torque during the operation of the upshifting.

13. The control device according to claim 3, wherein in the torque increase control, output torque from the rotating electrical machine is controlled such that the wheel transmission torque is maintained at required torque during the operation of the upshifting.

14. The control device according to claim 12, wherein
the operation of the upshifting includes a torque phase and an inertia phase, the torque phase being a period during which a drive power transmission path in the automatic transmission shifts from a state of the first shift speed to a state of the second shift speed, with rotational speed of the rotating electrical machine maintained in a state of the first shift speed, and the inertia phase being a period during which rotational speed of the rotating electrical machine shifts from the state of the first shift speed to a state of the second shift speed after the torque phase,
the torque increase control is performed in the torque phase, and
output torque from the rotating electrical machine having been increased by the torque increase control is torque based on (T×G1/G2) in which T is the requirement-based torque before starting the torque phase, G1 is a gear ratio of the first shift speed, and G2 is a gear ratio of the second shift speed.

15. The control device according to claim 4, wherein in the torque increase control, output torque from the rotating electrical machine is controlled such that the wheel transmission torque is maintained at required torque during the operation of the upshifting.

16. The control device according to claim 13, wherein
the operation of the upshifting includes a torque phase and an inertia phase, the torque phase being a period during which a drive power transmission path in the automatic transmission shifts from a state of the first shift speed to a state of the second shift speed, with rotational speed of the rotating electrical machine maintained in a state of the first shift speed, and the inertia phase being a period during which rotational speed of the rotating electrical machine shifts from the state of the first shift speed to a state of the second shift speed after the torque phase,
the torque increase control is performed in the torque phase, and
output torque from the rotating electrical machine having been increased by the torque increase control is torque based on (T×G1/G2) in which T is the requirement-based torque before starting the torque phase, G1 is a gear ratio of the first shift speed, and G2 is a gear ratio of the second shift speed.

17. The control device according to claim 8, wherein
the operation of the upshifting includes a torque phase and an inertia phase, the torque phase being a period during which a drive power transmission path in the automatic transmission shifts from a state of the first shift speed to a state of the second shift speed, with rotational speed of the rotating electrical machine maintained in a state of the first shift speed, and the inertia phase being a period during which rotational speed of the rotating electrical machine shifts from the state of the first shift speed to a state of the second shift speed after the torque phase,
the torque increase control is performed in the torque phase, and
the torque reduction control is performed during a period from when it is determined to perform the upshifting until the torque phase starts.

18. The control device according to claim 8, wherein in the torque reduction control, reduction rates of output torque from the rotating electrical machine in a start period and an end period of a period during which the torque reduction control is performed are smaller than a reduction rate of output torque from the rotating electrical machine in a middle period between the start period and the end period of the period during which the torque reduction control is performed.

19. The control device according to claim 9, wherein
the operation of the upshifting includes a torque phase and an inertia phase, the torque phase being a period during which a drive power transmission path in the automatic transmission shifts from a state of the first shift speed to a state of the second shift speed, with rotational speed of the rotating electrical machine maintained in a state of the first shift speed, and the inertia phase being a period during which rotational speed of the rotating electrical machine shifts from the state of the first shift speed to a state of the second shift speed after the torque phase,
the torque increase control is performed in the torque phase, and
the torque reduction control is performed during a period from when it is determined to perform the upshifting until the torque phase starts.

20. The control device according to claim 9, wherein in the torque reduction control, reduction rates of output torque from the rotating electrical machine in a start period and an end period of a period during which the torque reduction control is performed are smaller than a reduction rate of output torque from the rotating electrical machine in a middle period between the start period and the end period of the period during which the torque reduction control is performed.

* * * * *